(12) United States Patent
Damhaug et al.

(10) Patent No.: US 9,996,197 B2
(45) Date of Patent: Jun. 12, 2018

(54) CAMERA-BASED MULTI-TOUCH INTERACTION AND ILLUMINATION SYSTEM AND METHOD

(75) Inventors: Oystein Damhaug, Trondheim (NO);
Hallvard Naess, Trondheim (NO);
Tormod Njolstad, Trondheim (NO)

(73) Assignee: SEIKO EPSON CORPORATION, Tokyo (JP)

( * ) Notice: Subject to any disclaimer, the term of this patent is extended or adjusted under 35 U.S.C. 154(b) by 0 days. days.

(21) Appl. No.: 13/814,831

(22) PCT Filed: Nov. 22, 2011

(86) PCT No.: PCT/NO2011/000329
§ 371 (c)(1),
(2), (4) Date: Feb. 7, 2013

(87) PCT Pub. No.: WO2012/070950
PCT Pub. Date: May 31, 2012

(65) Prior Publication Data
US 2013/0135260 A1    May 30, 2013

Related U.S. Application Data

(60) Provisional application No. 61/416,116, filed on Nov. 22, 2010.

(30) Foreign Application Priority Data

Dec. 14, 2010   (GB) .................................. 1021212.4

(51) Int. Cl.
*H04N 1/00*     (2006.01)
*G06F 3/042*    (2006.01)
*G06F 3/03*     (2006.01)

(52) U.S. Cl.
CPC .......... *G06F 3/0425* (2013.01); *G06F 3/0304* (2013.01); *G06F 3/0421* (2013.01)

(58) Field of Classification Search
CPC .......... G06F 3/037; G06F 15/62; G06F 3/042; G06F 3/0428; G06F 3/0421;
(Continued)

(56) References Cited

U.S. PATENT DOCUMENTS 3,673,327 A * 6/1972 Johnson ................ G06F 3/0421
178/18.04
5,297,061 A * 3/1994 Dementhon et al. ......... 345/180
(Continued)

FOREIGN PATENT DOCUMENTS

CN       201331752 Y    10/2009
EP       1 336 172 B1    6/2007
(Continued)

OTHER PUBLICATIONS

Pavlovic et al., "Visual Interpretation of Hand Gestures for Human-Computer Interaction: A Review," *IEEE Transactions on Pattern Analysis and Machine Intelligence*, Jul. 1997, pp. 677-695, vol. 19, No. 7.
(Continued)

*Primary Examiner* — Abdul-Samad A Adediran
(74) *Attorney, Agent, or Firm* — Oliff PLC

(57) ABSTRACT

A method, system and apparatus is provided for controlling and interacting within an interaction volume and/or surface of a computer. The method, apparatus and system is optionally employed together with, or even be integrated into, data projectors of all types and its fixtures/stands, and used together with flat screens (LCD, plasma, OLED, rear-projection screen and so forth) to render such display systems interactive. The apparatus incorporates a camera covering the interaction area from either a very short distance or from (Continued)

a larger distance to determine the lateral positions (X, Y) and even capturing the pose of the finger(s), hand(s) or other interacting object(s), which optionally include the determination of "touch" and "hovering".

25 Claims, 28 Drawing Sheets

(58) Field of Classification Search
CPC .... G06F 3/03545; H04N 5/225; G01N 21/86; G09G 5/00; B60Q 1/00
USPC .......................... 250/559.29, 221; 340/425.5; 345/173–175, 180; 364/559; 702/95, 702/152; 178/18.04
See application file for complete search history.

(56) References Cited

U.S. PATENT DOCUMENTS

| | | | | |
|---|---|---|---|---|
| 6,100,538 | A | * | 8/2000 | Ogawa ..................... 250/559.29 |
| 6,700,129 | B1 | * | 3/2004 | Usuda ................. G06F 3/03545 250/221 |
| 2003/0006973 | A1 | * | 1/2003 | Omura et al. ................ 345/175 |
| 2009/0040195 | A1 | * | 2/2009 | Njolstad et al. ............. 345/180 |
| 2010/0013860 | A1 | | 1/2010 | Mandella et al. |
| 2010/0066675 | A1 | | 3/2010 | Wilson et al. |
| 2010/0085330 | A1 | * | 4/2010 | Newton ................ G06F 3/0428 345/175 |
| 2010/0182137 | A1 | * | 7/2010 | Pryor ......................... 340/425.5 |
| 2010/0188370 | A1 | * | 7/2010 | Morrison et al. ............ 345/175 |
| 2010/0277576 | A1 | * | 11/2010 | Fattal et al. .................... 348/54 |

FOREIGN PATENT DOCUMENTS

| | | |
|---|---|---|
| KR | 10-2010-0109420 | 10/2010 |
| WO | WO 99/40562 A1 | 8/1999 |
| WO | WO 02/054169 A2 | 7/2002 |
| WO | WO 2004/072843 A1 | 8/2004 |

OTHER PUBLICATIONS

Zhou et al., "Trends in Augmented Reality Tracking, Interaction and Display: A Review of Ten Years of ISMAR," *IEEE International Symposium on Mixed and Augmented Reality*, Sep. 15-18, 2008, pp. 193-202, Cambridge, UK.
Wilson, "PlayAnywhere: A Compact Interactive Tabletop Projection-Vision System," *UIST'05*, Oct. 23-27, 2005, Seattle, WA.
International Search Report issued in International Patent Application No. PCT/NO2011/000329 dated Feb. 13, 2012.
British Search Report issued in British Patent Application No. 1021212.4 dated Apr. 18, 2011.

* cited by examiner

CAMERA-BASED MULTI-TOUCH INTERACTION AND ILLUMINATION SYSTEM AND METHOD

FIELD OF THE INVENTION

The present invention relates to camera-based multi-touch interactive systems, for example utilizing camera-based input devices and visual and/or infrared illumination for tracking objects within an area/space, for example for tracking one or more fingers or a pen for human interaction with a computer; the systems enable a determination of a two-dimensional position within an area and a height over a surface of the area, for providing actual two-dimensional input coordinates and for distinguishing precisely between actual interaction states like "inactive" (no tracking), "hovering" (tracking while not touching, sometimes also labelled "in range") and "touching". The present invention also relates to multi-modal input devices and interfaces, which, for example, allow both pen and finger touch input, and also are operable to cope with several objects concurrently, for example a multi-touch computer input device. Moreover, the invention concerns methods of inputting gesture using three-dimensional based input devices and thereby capturing a human posture of, for example, a hand or a finger, and sequences of these can be recognized as gesture commands and/or position and orientation inputs for three-dimensional control.

BACKGROUND OF THE INVENTION

Camera based tracking of objects for human interaction with computers, in particular tracking of the hands and fingers, has attracted scientific, industrial and commercial interest over several decades. Reviews of achievements in this computational intensive field is given by Pavlovic et al., IEEE Trans. Pattern Analysis and Machine Intelligence, vol 19, No. 7, pp. 677-695, 1997, and by Zhou et al., IEEE Int. Symposium on Mixed and Augmented Reality, pp. 193-202, 2008. In many reported techniques, the objects are observed from several different viewpoints by one or more cameras to reduce a susceptibility of occlusions and for robust tracking and gesture interpretation.

For single camera-based tracking of finger touch and finger or hand gestures, features such as shadows, contours, texture, silhouette and image gradients of these objects, and even their mirror image reflected back from a glossy display surface, are extracted and utilized to update different model-based tracking systems to compute the finger's or hand's posture and to detect, for example, finger touching in real-time.

As an example of clever feature extraction, a published US patent application no. US2010/0066675A1 describes a single camera imaging touch screen system and feature extraction based on an observation that a shadow from a finger illuminated by a sideways illuminant is ultimately obscured by the finger when touching the screen, such that the shadow resembles a finger when not touching, while the shadow is narrowed substantially when the finger is touching the surface such that touch can be determined. The application includes an independent claim, however, which is anticipated by a public scientific article from 2005 by the inventor Andrew D. Wilson (ACM Proc. UIST' 2005, pp 83-92).

Earlier published patent applications nos. WO9940562 (A1), US006100538A and US2010188370 (A1) in principal describe object tracking systems utilizing finger touch or pen input, wherein at least two camera viewpoints are disposed at a periphery of a coordinate plane to determine coordinates of an object, for example a pointing finger, by triangulation.

A published international PCT patent application no. WO9940562 (A1) describes a system for detecting pen and finger touch in front of a computer monitor screen by using a single camera and by a periscope-like optical system consisting of one or several flat mirrors, recording two images of the screen looking sideways into a volume immediately in front of the screen, to determine the pen's or finger's coordinates and distance to the screen.

A published US patent application no. US006100538A describes an optical digitizer for determining a position of a pointing object projecting a light and being disposed on a coordinate plane, and a detector disposed on a periphery of the coordinate plane. Preferably, a pair of linear image sensors has a field-of-view covering the coordinate plane to function as a detector, and a collimator is disposed to limit a height of the field-of-view of the detector. The detector is operable to receive only a parallel component of the light which is projected from the pointing object substantially in parallel to the coordinate plane, and a shield is disposed to block noise light other than the projected light from entering into the limited view field of the detector. A processor is provided for computing the coordinates representing the position of the pointing object.

A published US patent application no. US2010188370 (A1) describes a camera-based touch system including at least two cameras having overlapping viewing fields, placed along the periphery and typically in the corners of a touch surface to detect a position of a pointer by triangulation, and to detect the pointer touch and pointer hover above the touch surface.

A granted Chinese patent no. CN201331752 describes a multi-point touching system for a transparent display. The system employs an illumination of a projection light plane from the rear side with infrared light and operates by observing the illumination of finger tips by an infrared sensitive CCD camera from the rear side.

A granted European patent no. EP1336172 describes an input device apparatus and method of detecting and localizing interactions of user-objects with a virtual input device. The apparatus is adapted to operate with hand-held devices based on a detection of objects penetrating a light plane.

In a published Korean patent application no. KR2010 0109420A (Dongseo Technology Headquarters), there is described an interactive display system of a multi-touch base for freely performing interaction with contents. The system is arranged to provide an interactive area on a screen to facilitate an interaction function with contents presented at the interaction area. Moreover, the system employs an Infra-Red (IR) light emitting diode (LED) array bar to generate an interactive layer illuminated by IR radiation. An IR camera is employed in the system to image reflected IR radiation from a human body or an object touching the interactive layer. A server including computing hardware is employed to compute coordinate values of the interaction position of the human body or object from signals generated by the IR camera.

In a published international PCT patent application no. WO 02/054169A1, there is described a data input device and an associated method. The device includes an illuminator which is operative to illuminate at least one engagement plane by directing light along the at least one engagement plane. Moreover, the device includes a two-dimensional imaging sensor viewing at least one engagement plane from a location outside the at least one engagement plane for sensing light from the illuminator scattered by engagement of a data entry object, for example a user's finger, with the at least one engagement plane. Furthermore, the device includes a data entry processor for receiving an output from the two-dimensional imaging sensor and providing a data input to utilization circuitry.

In a published international PCT patent application no. WO 20041072843A1, there is described a touch screen which uses light sources at one or more edges of the screen. The one or more light sources direct light across a surface of the screen. There is also included two cameras having electronic outputs, wherein the two cameras are located at a periphery of the screen to receive light from the light sources. A data processor is also included to receive the outputs of the two cameras and is operable to execute one or more software products for performing triangulation computations for determining one or more locations of one or more objects in proximity to the screen. Detecting the presence of an object includes detecting at the two cameras the presence or absence of direct light due to the object, using the surface of the screen as a mirror. The cameras are employed to detect the presence or absence of reflected light due to the object at the surface. Optionally, the light sources are modulated to provide radiation at the two cameras in a sensitive radiation band width of the two cameras.

In general, it is important that a user's intentions and commands are correctly recognized in man-machine interaction systems. An accuracy of object position detection in respect of X and Y ordinates in a coordinate plane employed may, or may not, be important depending upon circumstances, namely is dependent upon application. Consequently, finger touch systems are attractive where, for example, modest accuracy is required for moving or selecting graphical objects or accessing menus, whereas a stylus or a pen is preferred when an highest accuracy is required, for example for applications concerned with fine writing or drawing, or handling details and objects in CAD-programs. Therefore, in a finger based system, feature extraction and robust heuristics for the determination of the finger's coordinates may be sufficient, based on a two-dimensional image from a single camera.

However, for all types of applications, high precision related to detection of finger or pen touching is of outmost importance, and must never fail, because then the user may lose control over the application. A high and constant detection quality of the touching condition is therefore required in every position in a coordinate plane which is utilized. The detection method should furthermore not be susceptible to variations in finger size, skin color, ambient light conditions, display light and so forth, and the detection should be fast and uniform over the coordinate plane, and without any user-dependent behavior or delay penalty occurring.

There is a great contemporary interest in interaction systems using pen, touch or both (dual-mode systems) for education, collaboration and meetings. Several new interaction platforms also allow simple pen or finger gesture control, and/or even hand gesture based interaction. Specifically, there is a great global interest in interactive tablets and whiteboards for use within education both in normal classrooms and in large lecture halls. Such whiteboards are also entering contemporary meeting rooms, video conferencing rooms and collaboration rooms. Images on an interactive whiteboard's coordinate plane may be generated as a projected image from a short-throw or long-throw data projector, or by a flat screen; the flat is implemented, for example, as a LCD device, a plasma display, OLED device or a rear-projection system. It is important that the input device for touch and/or pen can be used together with all types of display technologies without reducing the picture quality or wearing out associated equipment. It is furthermore important that input device technology can be easily adopted to different screens, projectors and display units with low cost and effort.

New interactive whiteboards are commonly equipped with short-throw projectors, for example projectors with an ultra wide-angle lens placed at a short distance above an associated screen. Such a manner of operation results in the user being less annoyed by light into his/her eyes and will tend to cast less shadows onto the screen, and the projector can be mounted directly onto a wall together with the whiteboard. An ideal input device for pen and touch for such short-throw systems should therefore be integrated into or attached alongside the wall projector, or attached to the projector wall mount, to make installation simple and robust.

In lecture halls, very long interactive whiteboards and interaction spaces are required, and these interaction surfaces should beneficially provide touch, pen and gesture control. On large format screens, pointing sticks and laser pointers are often required to draw the public's attention. The preferred input technology should be apt to all such diverse requirements, namely should also accept pointing sticks and lasers as a user input tool, and be tolerant to and adaptable to different display formats.

Moreover, flat screen technologies may need touch and/or pen operation, simple pen and/or touch gesture interaction, and ultimately hand gesture control. Touch sensitive films laid on top of a flat screen cannot detect hovering or in-the-air gestures. Pure electro-magnetic pick-up systems behind a flat screen cannot detect finger touch or finger gestures, only pen operation is possible. However, some types of flat display technologies, in particular OLED displays, can be transparent, thus camera-based technologies can be used for gesture control through the screen. If dual-mode input systems including hovering and gestures continue to become increasingly important and standardized for providing an efficient and natural user interface, optically based input systems will thus be preferred also for flat interactive screens instead of capacitive or resistive films or electro-magnetic based solutions. Therefore, the preferred input device technology should be optically based and should be suitable to adapt to both conventional flat screens (LCD, plasma, LED) and transparent flat screens like the OLED and rear-projection screens.

Input devices should not be susceptible to light sources as daylight, room illumination, the light from the projector or display screen and so forth. Furthermore, input devices should not be susceptible to near infra-red radiation from sunlight, artificial light or remote control units or similar which utilize near infrared light emitting diodes for communication. Moreover, the input devices should further exhibit a high coordinate update rate and provide low latency for achieving a best user experience.

Input devices should preferably be adaptable to fit into existing infrastructure, for example to upgrade an existing installed pen-based interactive whiteboard model to also allow finger touch and hand gesture control, or to upgrade a meeting or education room equipped already with an installed projector or flat screen, or to become interactive by a simple installation of the input device itself.

In some scenarios, input technology can even be usable without interactive feedback onto the writing surface itself, for example by capturing precisely strokes from a chalk and sponge on a traditional blackboard and recognizing hand gestures for control of a computer; or by capturing normal use of pen and paper (including cross-outs) and simple gestures for control of the computer; or by capturing the user's information by filling in a paper form or questionnaire including his/her signature, while the result is stored in a computer and the input or some interpretation of the input is shown by its normal computer screen or by a connected display or a projector for the reference of the user and the audience. This means that the input device should be possible to use stand-alone or separated from costly display technology in cases where this type of infrastructure is not available or needed.

In the same way that interactive whiteboards are replacing traditional chalk and blackboard in educational establishments, novel interaction spaces are emerging in other arenas. Multi-user interactive vertical and horizontal surfaces are introduced in collaborative rooms and control rooms, museums and exhibitions. Moreover, interactive spaces including interactive guest tables are established in contemporary commercial premises such as bars, casinos cafés and shops, to make it possible for guests to select from a menu, order and pay, as well as receiving entertainment, for example by playing computer games, browsing the internet or reading news reports.

However, a contemporary problem arises is that input devices for monitoring touching and/or hovering movements in an interaction space are not sufficiently accurate and develop to address needs of many information input and display systems. The present invention is devised to at least partially address these contemporary problems.

SUMMARY OF THE INVENTION

It is an aim of the present invention to provide systems including interactive spaces for human interaction with a computer, enabling several concurrent users, enabling dual-mode mode operation, namely multi-touch finger input and pen input concurrently, as well as finger and hand posture input, and capturing sequences of human posture and gesture commands for advanced multi-modal human computer interaction.

It is further an aim of the present invention to provide dual-mode multi-touch input system to be used together with or integrated into wall mount and table mount data projectors and flat displays to make such systems interactive, and also to upgrade existing pen-based interactive whiteboard to include multi-touch input.

According to a first aspect of the invention, there is provided a system as defined an appended claim 1: there is provided a camera-based multi-touch interaction system for determining a position and/or a posture of at least one object in front of an interaction surface, wherein the system includes:
   an illuminant arrangement for generating one or more planar fan-shaped light beams of visible and/or near-infrared light radiation;
   a camera arrangement for sensing the interaction surface within the camera's field-of-view to generate corresponding signals;
   a computational unit for computing the position and/or the posture of the at least one object intercepting the one or more planar fan-shaped light beams based on the signals provided from the camera,
characterized in that
   the one or more fan-shaped light beams are formed in operation so that their planes are substantially parallel to the interaction surface; and
   the one or more fan-shaped light beams are focused in a direction substantially perpendicular to a plane of the interaction surface so that the one or more fan-shaped beams have a substantially constant thickness relative to an orthogonal to the plane of the interaction surface for enhancing the light intensity and increase the accuracy of position determination of the at least one object provided by the system.

The system is of advantage in that the one or more fan-shaped beams enable a more accurate determination of a position of the one or more objects relative to the interaction surface to be achieved.

Optionally, the system is implemented so that one or more fan-shaped light beams illuminate the interaction surface, such that a determination of touching of the object with the interaction surface is enhanced.

Optionally, the system is implemented to be operable to detect a hovering position of the at least one object in respect of the interaction surface.

Optionally, the system is implemented to be operable to generate a plurality of fan-shaped light beams, wherein each fan-shaped light beam is disposed to illuminate a corresponding spatial region in a vicinity of the interaction surface, such that the corresponding spatial regions of the fan-shaped light beams provide for contiguous illumination of a complete region in a vicinity of the interaction surface.

Optionally, the system is implemented so that the one or more fan-shaped light beams are arranged in operation to illuminate a volume adjacent to the interaction surface, but not the interaction surface itself.

Optionally, the system is implemented so that the illuminant arrangement includes light sources which are operable to be selectively modulated in intensity for enhancing a determination of touching of the one or more objects onto the interaction surface, a hovering and/or a hovering level of the one or more objects relative to the interaction surface. More optionally, the system is implemented so that the light sources are operable to be selectively switched on and off. More optionally, the system is implemented so that the light sources are operable in a flashing mode within an active sensing period of the camera arrangement for effectively freezing motions of the one or more objects.

Optionally, the system is implemented so that the camera arrangement includes one or more optical filters for selectively blocking out or passing radiation to be received by sensors of the camera arrangement depending upon a wavelength of the radiation. More optionally, the one or more optical filters are operable to allow light intercepted by the one or more objects with the same wavelength range as light emitted from the illuminant arrangement to pass through to camera sensors. More optionally, the one or more optical filters are operable to only visible light to pass therethrough for capturing the images from a projector or flat screen at the interaction surface.

Optionally, the system is implemented so that the illuminant arrangement includes a plurality of light sources for generating the one of more fan-shaped light beams to include radiation at near-infrared wavelengths, and wherein the camera arrangement includes one or more optical filters which block visible radiation wavelengths and transmits near-infrared radiation wavelengths to reduce sensitivity of the system to other light sources including one or more of: daylight, room illumination, light from projectors, display lights.

Optionally, the system is implemented so that it is susceptible to being integrated into new equipment or retrofitted into existing equipment and is adapted for making such equipment interactive.

Optionally, the system is implemented as a front or rear projection apparatus.

Optionally, the system is adapted to be operably mounted onto or integrated into projector wall mounts or screen mounts including at least one of: LCD, OLED, LED, CRT.

Optionally, the system is implemented so that the illuminant arrangement includes one or more enclosures whose respective lengths for their associated illumination optical components is of a sufficiently long length for rendering different layers of focused fan-shape light beams sufficient thin to increase a resolution and accuracy of the system to touching and Z-directional gestures of the one or more objects relative to the interaction surface.

Optionally, the system is implemented so that the illuminant arrangement includes one or more light emitting laser diodes which are operable to emit near-infrared radiation for further reducing a thickness of the one or more fan-shaped light beams in a direction orthogonal to a plane of the interaction plane.

Optionally, the system is implemented so that the camera arrangement is implemented using CCD or CMOS pixel sensors, and the illuminant arrangement is implemented using near-infrared LEDs and associated optical components adapted to transmit and/or reflect near-infrared radiation.

Optionally, the system is implemented so that the illuminant arrangement includes:
  a convex lens for providing focusing of radiation transmitted therethrough;
  a plurality of illumination sources, wherein the illumination sources are arranged substantially spread along a portion of a periphery of a circle having a centre in a central axis of the lens to ensure concentrated radiation intensity in the sectors of the focused fan-shaped light beam and also to help spreading associated heat dissipation;
  a baffle arranged to limit the illumination from the illumination sources to approximately half the diameter of the convex lens; and
  a conical mirror to change a symmetry axis to be substantially parallel to the interaction surface.

More optionally, the system is implemented so that the conical mirror has a reflecting surface angle which is adapted to tilt the optical symmetry axis of light beams from the illuminant arrangement forming the fan-shaped light beams towards the interaction surface.

More optionally, the system is implemented so that the baffle is arranged to stop light rays from each illumination source of the illuminant arrangement with perceived source size from illuminating the opposite part of the convex lens, thereby substantially preventing any light ray from crossing the common optical axis of the lens and the conical mirror.

More optionally, the system is implemented so that the illuminant arrangement further includes the conical mirror arranged so that its reflecting surface angle is adapted to compensate for axes of light sources employed to generate the one or more fan-shaped light beams being non-aligned to a central axis of the convex lens.

Optionally, the system is implemented so that the one or more fan-shaped light beams have associated front borders which are arranged sufficiently distanced from the interaction surface to illuminate an area corresponding to the entire interaction surface such that the rear borders are essentially bounded by the interaction surface.

According to a second aspect of the invention, there is provided an apparatus for use in implementing the system pursuant to the first aspect of the invention.

According to a third aspect of the invention, there is provided a method of employing a camera-based multi-touch interaction system for determining a position and/or a posture of at least one object in front of an interaction surface, wherein the system includes:
  an illuminant arrangement for generating one or more planar fan-shaped light beams of visible and/or near-infrared light radiation;
  a camera arrangement for sensing the interaction surface within the camera's field-of-view to generate corresponding signals;
  a computational unit for computing the position and/or the posture of the at least one object intercepting the one or more planar fan-shaped light beams based on the signals provided from the camera,
characterized in that the method includes:
  forming the one or more fan-shaped light beams in operation so that their planes are substantially parallel to the interaction surface; and
  focusing the one or more fan-shaped light beams in a direction substantially perpendicular to a plane of the interaction surface so that the one or more fan-shaped beams have a substantially constant thickness relative to an orthogonal to the plane of the interaction surface for enhancing the light intensity and increase the accuracy of position determination of the at least one object provided by the system.

Optionally, the method is adapted for providing advanced user multi-touch interaction into education and business marked, for providing small and medium displays, for providing large and wide school and lecture hall whiteboards, for use with or without a display in education, for interactive signage, and in museums and exhibitions.

According to a fourth aspect of the invention, there is provided a system including an input device in man-machine communication or synonymously human-computer interaction, for tracking an object's position within an interaction surface or synonymously a coordinate plane, for detecting of hovering and/or touch conditions within an interaction volume located at the interaction surface within a range of heights; and/or for recognizing the object's posture, characterized in that the system includes:
  a camera for capturing an image using visible light and/or near infrared light; at least one visible and/or near infrared fan-shaped beam light plane specifically aligned with the coordinate plane; and
  a computational unit;
wherein the camera's field-of-view includes both the coordinate plane and at least one fan-shaped light beam plane;
wherein the computational unit is adapted to calculate from signals generated by the camera the object's coordinates, and/or its hovering and/or touch condition and/or the posture characteristics based on a single image received by the computational unit, and/or
wherein the computation unit is adapted to calculate from signals generated by the camera the object's movement and/or the object's gestures based on a sequence of images.

In the context of the present invention, a light plane is to be understood to be a contiguous volume slice of illumination provided by one or more focused fan-shaped light beams, wherein each fan-shaped light beam is a narrow, fan-like beam of visual or near infrared light rays, namely with a narrow beamwidth by focusing in elevation, and a broad beamwidth in azimuth, where elevation and azimuth angles are related to the plane of the interaction surface. The focused fan-shaped light beam is substantially parallel or converging to the interaction surface, namely with an elevation of zero or slightly negative angle. One or more focused fan-shaped light beams beneficially form a contiguous volume slice of illumination in the interaction volume, which, in the description of the present invention, for simplicity is denoted by a light plane, while a more complete denotation is a narrow, contiguous volume slice illumination by one or more focused fan-shaped visual and/or near infrared light beams.

The camera comprises a CCD or a CMOS imaging chip or similar for 2-dimensional image capture, and a lens or similar with a field-of-view which is large enough to include the coordinate plane, the volume, and with a sufficient optical imaging quality for the actual wavelength ranges adapted to the actual imaging chip resolution. The camera is optionally alternatively implemented using a scanned sensor including a linear array of pixel sensor elements, or even a single sensing element scanned in at least two coordinate directions.

In some preferred embodiments of the present invention, the illuminator arrangements are optionally controlled by an on/off control switch, to turn the illumination on and off selectively for different images.

In some preferred embodiments of the present invention, the illumination source arrangement in the illumination arrangement is operated in a flashing mode within the active exposure period of the camera in order to freeze the motions related to moving objects.

In some preferred embodiments of the present invention, the camera comprises an optical filter to block out unwanted light, namely the light from the flat display or the projector screen and/or ambient light, while allowing light with the same wavelength range as the illumination to pass through.

In some preferred embodiments of the present invention, the camera comprises one or more selectable optical filters which selectively block out or pass through light of different wavelength ranges; for example, light for some images is allowed to pass with the same wavelength range as the illumination, while light for other images is allowed to pass only for visible light wavelengths for subsequent capture of the images from the projector or flat screen.

In some preferred embodiments the present invention may be combined with the innovations described in published patent applications nos. WO 2002027461 and U.S. Pat. No. 7,083,100B2, and/or WO2006135241A1 and US2009040195A1 which are hereby incorporated by reference. These innovations are concerned with objects which are equipped with patterns which are observable within a given wavelength range on its surface and/or inside its body and/or projected onto the screen, as means for more accurately tracking and/or for more accurately identifying the object and/or for detecting a state of different user interaction controls, for example buttons and so forth which according to the above mentioned innovations can alter the observable patterns. Moreover, the object's proximity to the surface or the proximity between different internal components of the object may be observed by combining the present invention with the optical proximity detector as described in published patent applications nos. WO2005050130 and U.S. Pat. No. 7,339,684B2 which are also hereby incorporated by reference.

In some preferred embodiments of the present invention, a simple computer-based calibration procedure is used for finding an accurate mapping of the coordinate plane to the display coordinates. Optionally, the calibration procedure is user-assisted, for example by showing crosses in several points on the display, while requiring manual pen or finger touching to find the mapping, namely for determining an appropriate transformation matrix describing a mapping of the coordinate plane to the display coordinates.

In some preferred embodiments of the present invention, a computer program is operable to present images on the display, wherein the images include patterns used for identification and tracking of objects, for example in a manner as described in published international PCT patent applications nos. WO2002027461 and U.S. Pat. No. 7,083,100B2, and/or WO2006135241A1 and US2009040195A1, which are automatically recognized by the camera for computing the transformation matrix to map the coordinate plane to the display coordinates; these earlier published applications are hereby incorporated by reference.

It is the purpose of the present invention to provide positional information in X and Y directions, as well as information of touch and hover (Z direction, representing user action information) from the user in a man-machine interface, which typically, but not necessarily, also includes a cooperative display.

It is the purpose of the present invention to provide at least one focused planar fan-shaped beam over an interaction surface or in an interaction volume, such that a penetration of the focused fan-shaped light beam by at least one object, for example a human finger, will be detected by a camera within its field-of-view arranged to sense the interaction surface, the interaction volume and the at least one penetrating object. The focused fan-shaped light beam which is delimited to a certain volume over the interaction surface, is operable to illuminate the object distinctively, since the intensity typically is significantly higher than the background illumination, and the at least one object is effectively found by image signal processing means, by searching for high intensity areas, by detecting edges and executing centroid calculations for finding the at least one object, for example one or more fingers.

It is further the purpose of the present invention to accommodate advanced multi-touch interaction which is utilized in human interface devices for computers and other electronic equipment. By including several layers of focused fan-shaped light beams in an interaction volume, fine details in the user's interaction including accurate touch control, hand posture and user gestures are susceptible to being captured. In an preferred embodiment of the present invention, the illumination source of generating each focused fan-shaped light beam is periodically switched on and off, for example strobed, such that the different layers of focused fan-shaped light beam are selectively switched on and off for differentiating their respective signal contributions, thereby effectively be able to distinguish between, for example, hover and touch conditions. By separating the interaction volume in several slices which are selectively illuminated by the different layers of planar fan-shaped light beams, the interaction volume can be analyzed effectively, with some resemblance to tomography imaging. The illumination can also be flashing, namely strobed with relatively short illumination duration relative to a time frame of the movements themselves, to freeze the movements as sensed in received signals.

In some further embodiments of the present invention, the planar fan-shaped light beams are generated from illumination provided from near-infrared light illumination sources, for example illuminations sources whose output radiation has a wavelength of 700 nm or greater. Furthermore, the camera beneficially includes an optical filter for blocking out visible light and similar, and thereby allowing only aforesaid near-infrared light preferentially to pass. In such embodiments of present the invention, there is less susceptibility to other light sources such as daylight, room illumination, the light from the projector employed, display light and so forth.

Beneficially, when implementing the present invention, the focused fan-shaped light beam is generated by focusing light towards a most distant end of the interaction surface/volume to maintain a sufficient illumination at the most distant end. It is also beneficial when implementing the present invention that the focused fan-shaped light beams be angled with a small angle relative to a surface of an associated whiteboard or similar, towards the interaction surface such that the focused fan-shaped light beam has a nearly constant and parallel distance to the surface.

Beneficially, when implementing the present invention, contrary to use of conventional light planes, the generation of an-shaped light beams are centralized and not distributed. In front and rear projection systems for generating images on walls and tables, the present invention is beneficially either integrated into new equipment or retrofitted into existing equipment for making such systems interactive, without the need for making complete frames of infrared light planes, namely merely by including the present invention as a centralized fan-shaped light beam generating unit and a camera together with an associated computation unit.

Beneficially, the present invention is of advantage in that it is susceptible to be mounted onto or integrated into projector wall mounts or screen mounts, for example based LCD, OLED, and similar light emitting devices.

In some alternative embodiments of the present invention, for very advanced interaction spaces, longer enclosures for the illuminations optics may be used for making the different layers of focused fan-shaped light beams thinner to increase the resolution and accuracy of touch and Z-directional gestures. In some further alternative embodiments one or more of LED sources can be replaced by near-infrared laser diodes to reduce the layer thickness of the fan-shaped light beams even more.

The present invention can utilize low cost CCD or CMOS camera technology components and low cost near-infrared LEDs and optical components. Such components are inexpensive in manufacture. Moreover, contemporary signal processing integrated circuits, for example signal processors, microcontrollers and microprocessors and programmable logic devices, are susceptible to being used to implement the present invention, wherein such integrated circuits are easy to program for actual application of the present invention. The present invention is therefore easy to implement in high production volumes.

The present invention is also capable of providing advanced user multi-touch interaction into education and business markets. The present invention is potentially suitable for small and medium displays, as well as large and wide school and lecture hall whiteboards. Moreover, the present invention is also susceptible to being used with or without a display in education, for interactive signage, and in museums and exhibitions.

The present invention will also be able to provide interactive spaces adapted for use within digital signage using flat displays or projector screens with digital content which can be altered dynamically, not only in a predetermined sequence from the content provider, but changed due to user input from touch and gesture control thus making signage even more flexible, informative and user friendly.

The present invention to provide will also be capable of providing input devices for touch and gesture control for use in interactive signage which are working well through vandal-proof thick windows and work well on all kinds of surfaces and flat screens with simple installation, to be suitable to install and use in indoor and outdoor public and commercial areas.

DESCRIPTION OF THE DRAWINGS

The invention is herein described, by way of examples only, with reference to accompanying drawings, wherein.

DESCRIPTION OF EMBODIMENTS OF THE INVENTION

Figure 1:
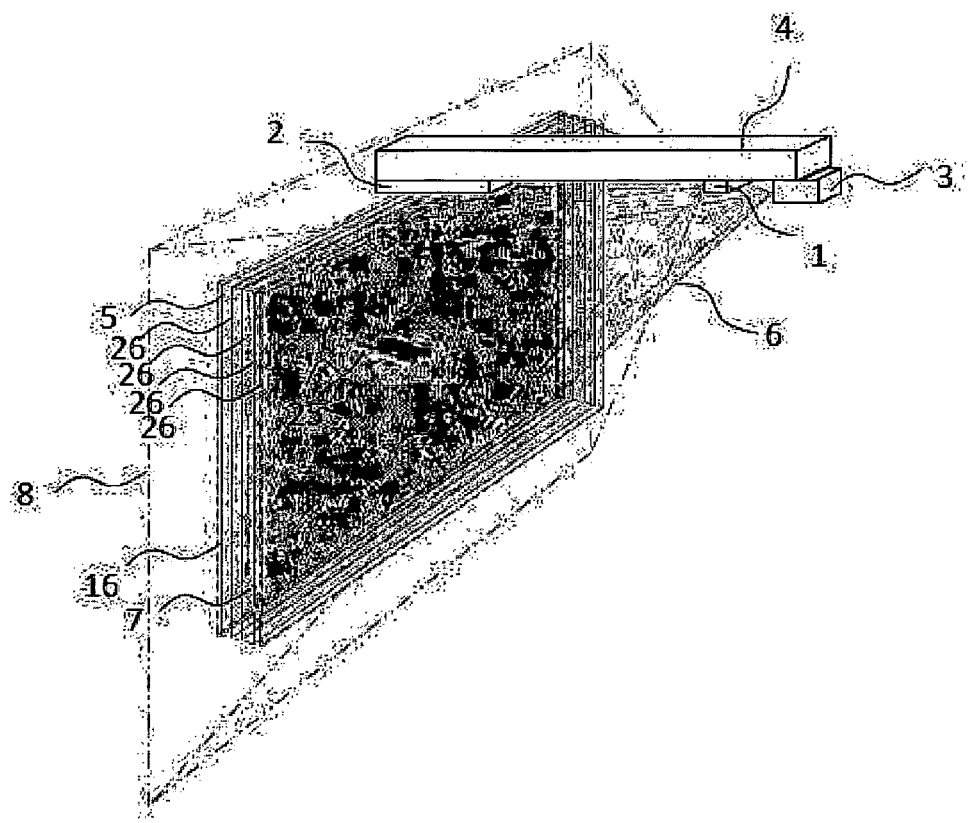
FIG. 1 is a schematic depiction in perspective, of an example hardware configuration of the present invention, wherein an example of the typical locations of the one or more light planes, the focused fan-shaped light beam generating unit, the interaction surface and volume, the camera, the display, the projector and the wall mount are shown.

The present invention concerns a system and a method for a camera based computer input device for man-machine interaction, or equivalently, human-computer interaction. Moreover, the present invention also concerns apparatus for implementing such systems and executing such methods.

Before describing an implementation and operation of at least one embodiment of the invention in detail, it is to be understood that the invention is not limited in its application to details of construction and arrangements of components set forth in the following description or illustrated in the drawings. The invention is capable of being implemented in other embodiments or of being practiced or carried out in various ways. Moreover, it is to be understood that the phraseology and terminology employed herein is for the purpose of description and should not be regarded as being limiting. The principles and operation of interaction input device apparatus, system and method, according to the present invention, are better understood with reference to the drawings and the accompanying descriptions.

Firstly, the principle of the interaction device and interaction system is described. Thereafter, the detailed description of some preferred embodiments are described along with its detailed system operation principles.

Figure 2:
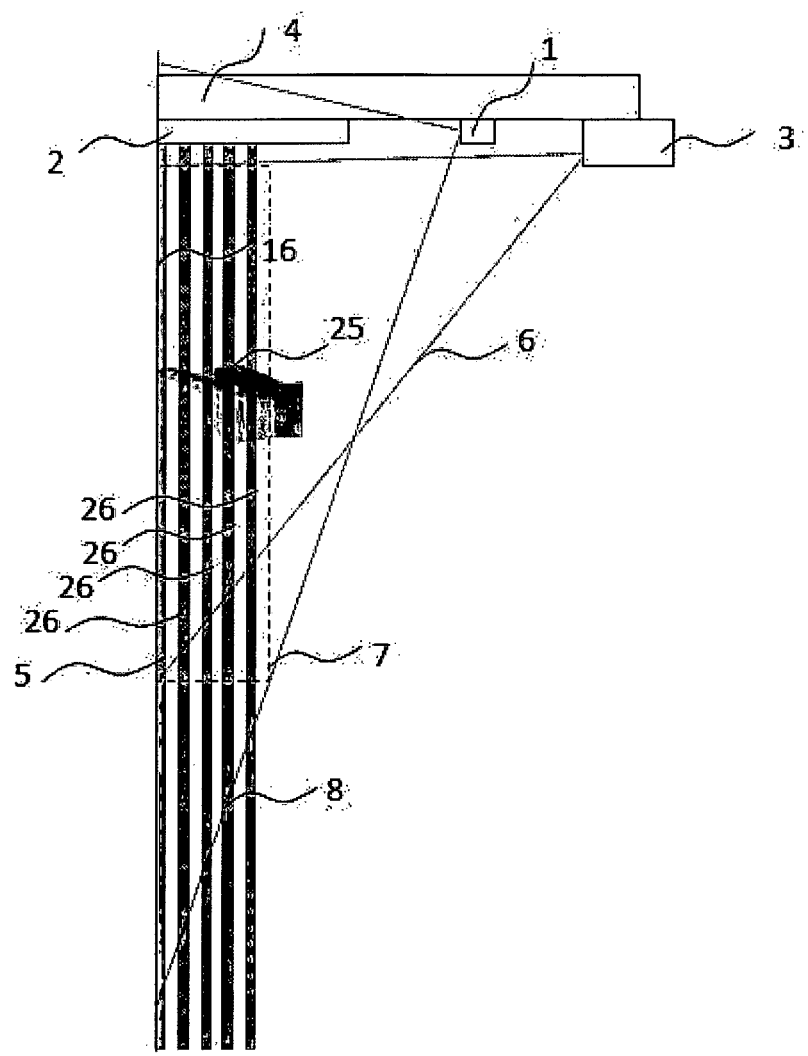
FIG. 2 is an illustration of the example configuration of FIG. 1 in a side view.

Principles of operation of an interaction system and its associated interaction apparatus are described by referring to an exemplary configuration as given in FIG. 1 and FIG. 2. In FIG. 1 and FIG. 2, there is schematically illustrated a hardware configuration of a preferred embodiment of the present invention, as seen in perspective and from side view. The hardware configuration includes hardware components comprising a short-throw data projector 3 placed along with a camera 1 and an illuminant 2 on a wall mount 4. The wall mount 4 has an appearance and a practical implementation which potentially varies significantly, but the main purpose of it is to place one or more of the short-throw projector 3, the camera 1 and the illuminant 2 at a proper distance to a screen and to a mount on a wall, preferably above a displayed picture 16. The displayed picture 16 also represents an interaction surface, in this document synonymously called the coordinate plane 16. Optionally, when using the projector 3, the coordinate plane 16 is a smooth and white surface suitable for projection, pen operation and touching. Conversely, in a case of using a flat display instead of the projector 3, the interaction surface 16 is the flat display itself, optionally protected with a special transparent material in typically glass or plastics material for protection, such that it is robust for pen and touch operation. The short-throw projector 3 has an associated field-of-view 6 and is operable to project a displayed picture onto the interaction surface 16, as represented by the dashed line rectangle within an interaction volume also denoted by 1. An object 25, for example a user's finger and/or hand, is operable to interact with a computer or similar when the object 25 is within an interaction volume 7 limited by a particular height over the coordinate plane 16.

The apparatus further includes an arrangement of optical components for projecting visible or near-infrared illumination, wherein the arrangement is situated outside the interaction surface, namely the coordinate plane 16, and associated projected illumination beneficially has a form of one or more light planes 5 inside the interaction volume 7, and substantially aligned with the interaction surface, namely the coordinate plane 16.

The camera 1 has a field-of-view 8 which includes the interaction volume 7, such that the object's 25 coordinates and the object's 25 hover height are calculated and/or its hovering condition and/or touch condition and/or the posture characteristics are derived based on a single image which is sensed by the camera 1 and conveyed as signals to by the computational unit, and/or the object's movement and/or the object's gestures are be further calculated based on a sequence of images represented in signals generated by the camera 1 and provided as corresponding signals conveyed to the computational unit. Optionally, the computational unit typically, but not necessarily, is embedded into the camera 1. The camera 1 optionally includes optical filters for selectively blocking out light of different wavelength ranges, for example to reduce the influence of daylight and light from the display and/or long-throw projector 3.

The computational unit includes communication apparatus for transferring the coordinates and the other interaction data to a computer, for example by using a standard serial bus and associated circuits (like USB), or by using wireless communication protocols and devices.

In FIG. 1, there is shown an exemplary configuration according to a preferred embodiment of the present invention where the focused fan-shaped light beam generating unit 2 and the camera 1 of the apparatus are mounted on the wall mount 4 together with the projector 3. The camera 1 and the projector 3 are directed towards the interaction surface 16 with a camera field-of-view 8 and a projector field of view 6 shown in FIG. 1. At least one object 25, namely illustrated here as an index finger and a hand, is operable to penetrate at least one single focused fan-shaped light beam plane 5 and/or 26 in the interaction volume 7 in front of the interaction surface 16, and the camera 1 and a computation unit are operable from a single picture to detect an illuminated part of the object 25 and find and report its lateral position in the lateral directions (X- and Y-directions) and also report at which hover level it is currently located in (i.e. Z-direction related information), given by which layer of focused fan-shaped light beam is illuminating the object 25, which is represented, for example, as "touch", which is synonymous with in contact with the interaction surface 16, and, for example, as "hover" synonymous with the "in range" state used in some interaction interface vocabulary, to be transmitted as input of the interacting computer.

FIG. 1 is also to be understood to depict a corresponding system adapted for a flat screen as the interface surface 16, namely without the projector 3 mounted on the wall mount 4.

Illumination employed in the embodiment illustrated in FIG. 1 is optionally switchable, thus one or more light planes 5 and/or 26 are optionally switched on or off, illuminating the object 25 by one of several light planes 5 and/or 26, or by a combination of several light planes 5 and/or 26, such that illumination is selected for the lateral position determination, and hover height determination, and determination of objects in contact with the interaction surface, respectively. For lateral position determination of the object 25, illumination through one or more light planes 5 and/or 26 located at a distance to the interaction surface 16 corresponding to the hovering distance allowed by the interaction volume 7 is switched on, forming a mainly constant height field of light rays, namely fan-shaped light beam, parallel to the plane which illuminates the part of the object 25 from the side when entering the light planes 5 and/or 26 within interaction volume 7 and thus also providing some contour determination of the object 25 when observed directly from the camera 1. For the determination of hover level, or height, sequentially switching on or off one or more light planes 26 located at different distances from the interaction surface 16, inside the interaction volume 7, enables a determination of hover level or height information by sequentially illuminating parts of the objects 25 inside the interaction volume 7 that are located at different distances from the interaction surface 16. For determining whether or not objects are in contact with, namely touching, the interaction surface 16, a light plane 5 generated essentially at the plane of the interaction surface 16 and directly illuminating the interaction surface 16 is switched on. The direct illumination of the interaction surface 16 from the light plane 5 is beneficially accomplished by creating a fan-shaped light beam positioned essentially at the plane of the interaction surface 16, and the optical symmetry axis of the fan-shaped light beam converging towards the plane of the interaction surface 16 while at the same time the fan-shaped light beam illuminates the interaction surface 16.

In all the exemplary configurations and preferred embodiments according to the present invention, there may further exist at least one outer shield or chassis, omitted here for clarity in the drawings, but which optionally enclose one or more of the hardware components: the projector 3, the camera 1 (optionally including the computational unit and communication apparatus), the illuminant 2 operably producing one or more light planes 5 and/or 26 (namely fan-shaped light beams), the wall mount 4 and the display and coordinate plane 16. The purpose for the outer shield or chassis is, for example, to render the interaction system robust, maintenance-free, dust proof, user-friendly, safer, easier to manufacture, simpler to install, and to present the system with a professional appearance according to some given principles and elements of design.

Referring further to FIG. 1 and FIG. 2, the illuminant 2 for generating the fan-shaped light beam is a generating unit, or synonymously the illuminant 2 for generating the focused fan-shaped light beam plane is illumination means, in this exemplary configuration, are beneficially located above the interaction surface 16, preferably either mounted on the wall or on the wall mount 4. The illuminant 2 is optionally included in a retrofit kit for upgrading an existing whiteboard or a short throw projector installation to become touch-sensitive pursuant to the present invention.

Figure 3:
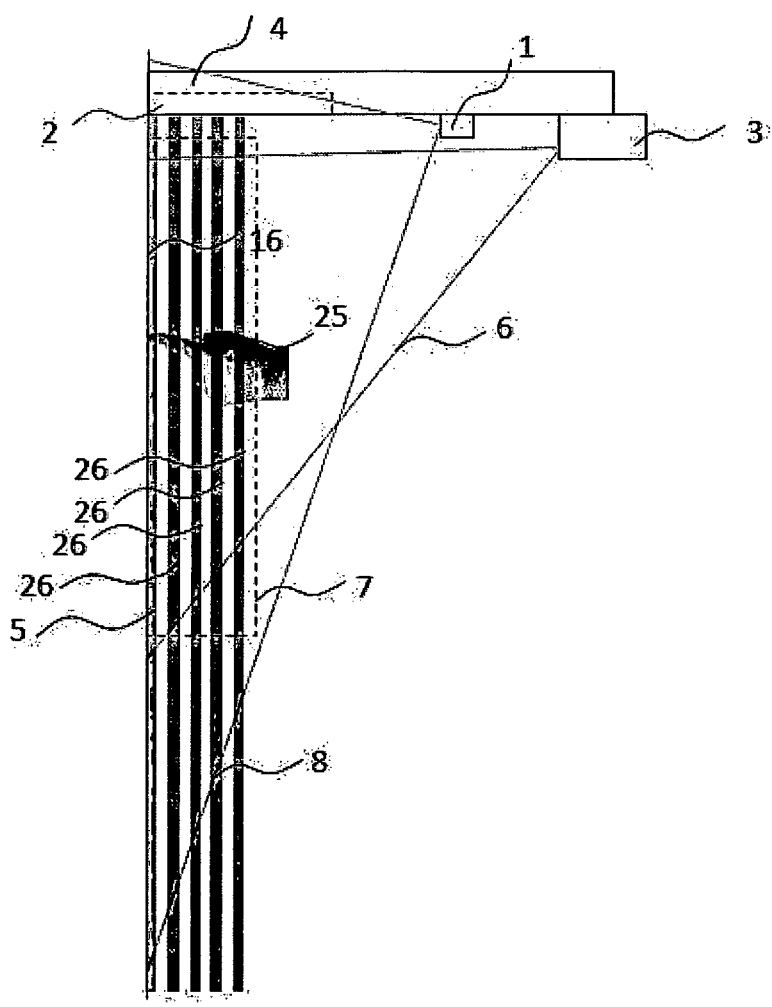
FIG. 3 is an illustration of the example configuration of FIG. 2 in a side view, wherein the focused fan-shaped light beam generating unit is integrated into the wall mount.

Referring to FIG. 3, the illuminant 2, for example a focused fan-shaped light beam plane illumination arrangement, is in these exemplary configurations integrated in the projector mount. Referring to FIG. 3, the same configuration as in FIG. 2 is presented in a side view, but in FIG. 3 the illuminant 2 implemented as the focused fan-shaped light beam plane generating unit is integrated into the wall mount 4.

Figure 4:
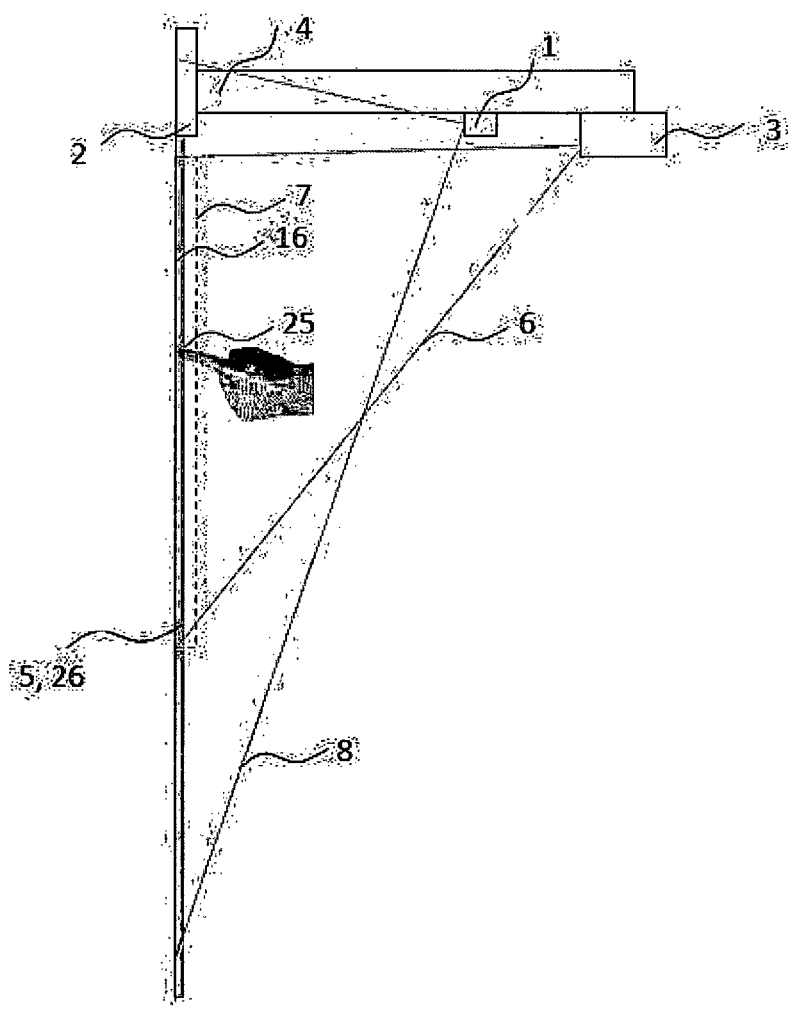
FIG. 4 is an illustration of the example configuration in FIG. 2 in a side view, wherein the focused fan-shaped light beam generating unit is vertically integrated into or vertically mounted along the wall mount.

Referring to FIG. 4, the same configuration as in FIG. 2 is presented in a side view, but in FIG. 4 the illuminant 2 implemented as a focused fan-shaped light beam plane generating unit is vertically integrated into or vertically mounted along the wall mount 4.

In further preferred embodiments of the present invention, the illuminant 2 implemented as a focused fan-shaped light beam illumination arrangement is not only an integral part of the wall mount 4, but is also an integral part of the mount of a flat screen display forming the interaction surface 16 or an integral part of the complete interactive whiteboard or an integral part of the complete data projector, or by other mechanical means be placed inside the above mentioned outer shield or chassis, thus being an integral part of a complete interactive system, while the function of the illuminant 2 implemented as a focused fan-shaped light beam illumination arrangement are the same.

Figure 5:
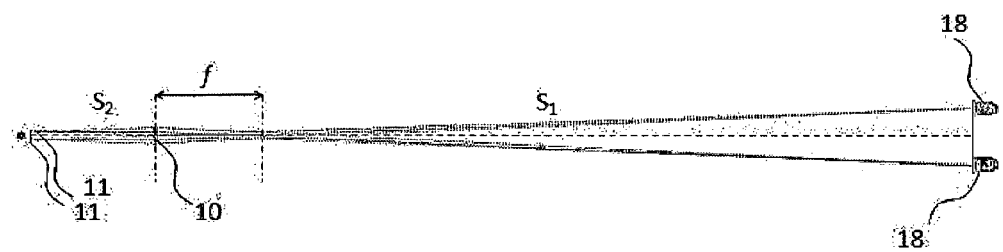
FIG. 5 is an illustration of a principle of operation of a source magnification and focusing arrangement employed in embodiments of the present invention.

Referring to FIG. 5 the principle of source magnification and focusing in the present invention is illustrated. Typically, a plurality of LED sources 11 are placed at a distance S2 from a single convex lens 10, optionally alternatively implemented as a concave mirror with a focal length f, and an image 18 of the illumination source 11 are focused at typically a most distant part of the interaction volume 7 over the interaction surface 16 at a range S1 with a magnification of S1/S2 of the illumination source 11 representing the minimum thickness of the actual focused fan-shaped light beam layer over the volume 7.

Figure 6:
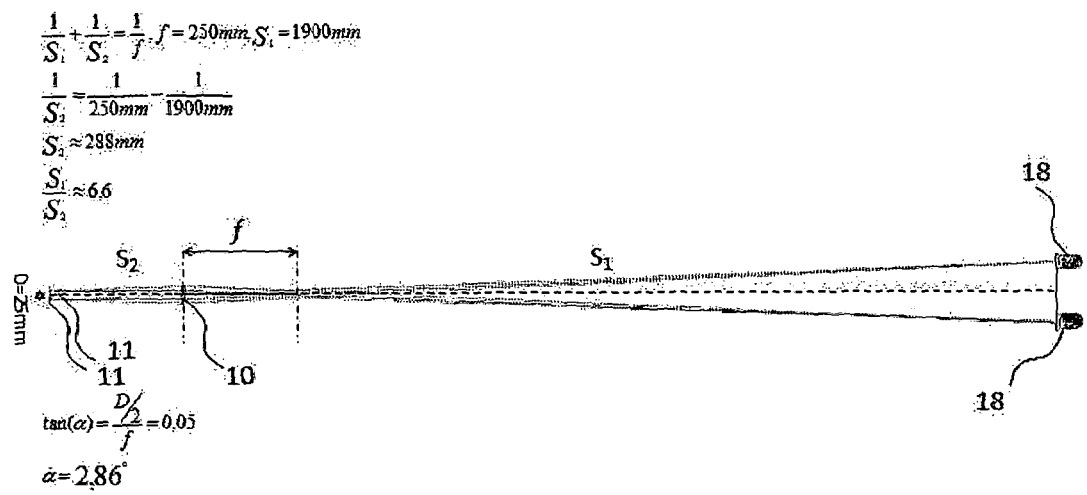
FIG. 6 is an illustration of the source of FIG. 5, but exemplified by inserting parameter values for a typical situation for a large interactive whiteboard.

Referring to FIG. 6, the same principle is illustrated as in FIG. 5, but parameter values for a typical situation for a large interactive whiteboard with a size of 90" to 100" (namely circa 225 cm to 250 cm) in diagonal is inserted, where the image of the source is in this example focused at S1=1900 mm. By using, for example, a lens with a focal length f=250 mm, the sources are beneficially placed at a distance S2=288 mm from the single convex lens 10. A magnification is about 6.6 is achieved and with an equivalent or perceived source size 27 of an illumination source 11 of the illuminant 2 (for source size 27, see FIG. 8B and FIG. 8C) of approximately 3.5 mm, a focused image 18 of the illumination source is approximately S1/S2 times larger, namely approximately 23.1 mm.

Figure 7:
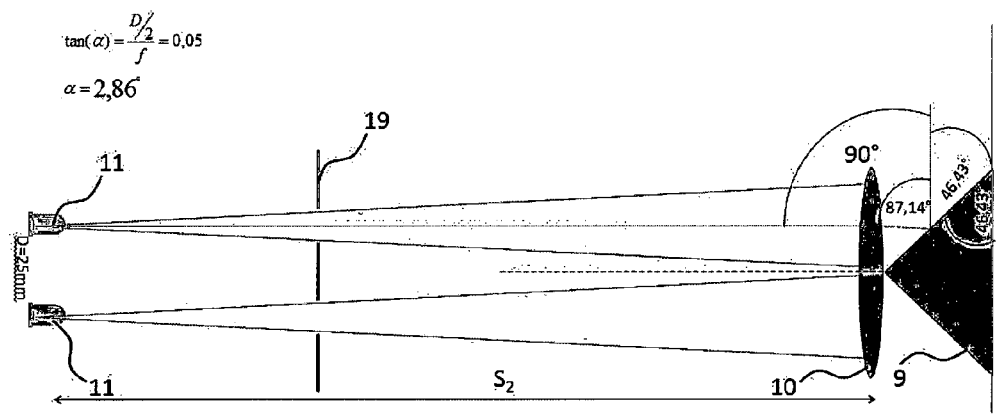
FIG. 7 is an illustration of an example of a related optical system as in FIG. 6, but wherein the rays are reflected by a conical mirror to change an associated symmetry axis to be parallel to a working/interaction surface.

Referring to FIG. 7, a related optical system as in FIG. 6 is presented, but now the rays are reflected by a conical mirror 9 to change a symmetry axis to be parallel to the working/interaction surface 16. The sources are placed in a diameter of D=25 mm from the central axis of the convex lens 10. There is a baffle 19 introduced to limit an illumination from the source to half the diameter of lens. The angle of the conical mirror is 46.43° to compensate for the axis of the light sources not passing through the lens central axis, and is therefore deflected.

Figure 8A:
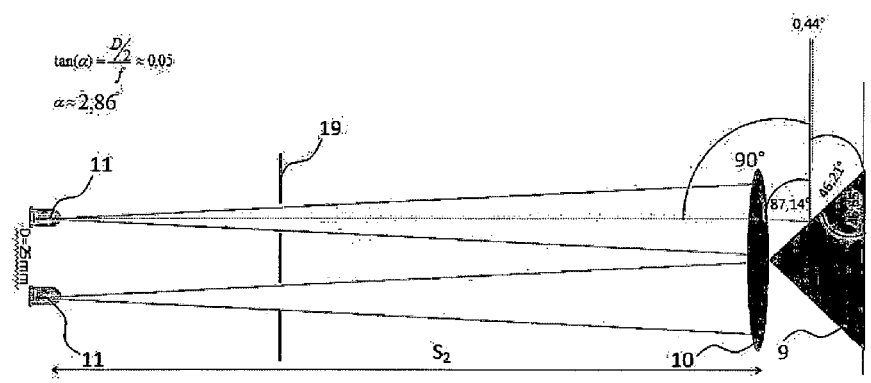
FIG. 8A is an illustration of an example of a related optical system as in FIG. 7, but wherein the angle of the conical mirror is adjusted to change the axis to be tilted somewhat towards the interaction surface.

Referring to FIG. 8A, a related optical system as in FIG. 7 is illustrated, but now the angle of the conical mirror 9 is adjusted to change the axis to be tilted somewhat towards the working/interaction surface 16 for illuminating the interaction surface directly by the fan-shaped light beam plane. An exemplary angle of the conical mirror is 46.65°, achieving an optical symmetry axis of the focused fan-shaped light beam that is tilted 0.44° towards the interaction surface 16. A front border of the fan-shaped light beam plane is sufficiently distanced from the interaction surface to illuminate the entire interaction surface 16, and a rear border of the fan-shaped light beam plane is essentially bounded by the interaction surface 16, as explained below.

Figure 8B:
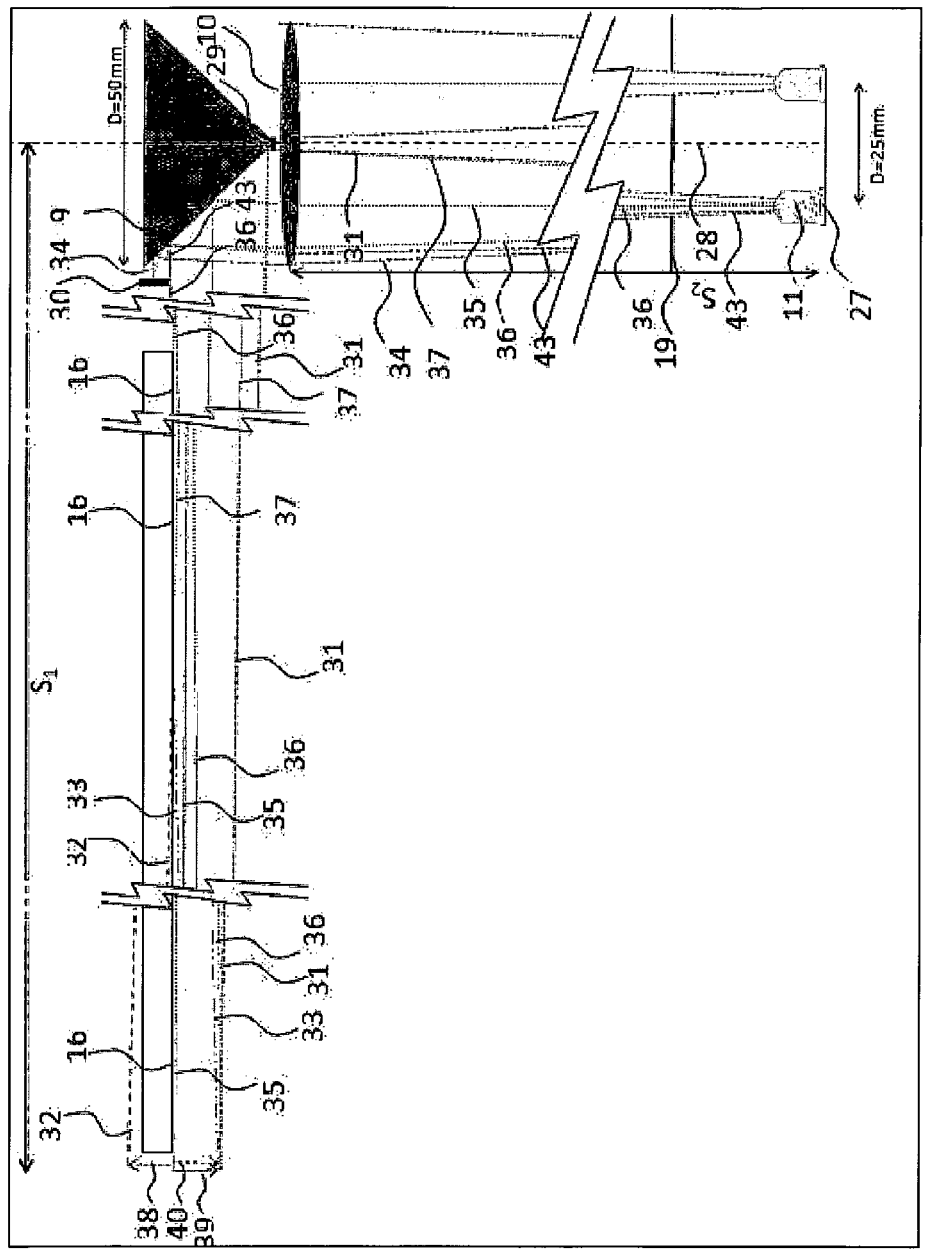
FIG. 8B is an illustration of an example of a related optical system as in FIG. 8A, wherein examples of fan-shaped light beams and the magnified source image are depicted, also including rays and source image component as likely reflected by the interaction surface, to make a light plane for detection of position and/or detection of contact with the interaction surface.

Referring to FIG. 8B, an exemplary configuration according to the present invention is presented of a related optical system as in FIG. 8A, where examples of light rays and the magnified source image are depicted, also including rays and source image component as likely reflected by the interaction surface, to generate a fan-shaped light beam plane for detection of position and/or detection of contact (or touch) with the interaction surface 16. The illumination sources 11, optionally implemented as light emitting diodes (LED), are placed along a circle of diameter D=25 mm. Several illumination sources 11 are beneficially spread along the periphery to ensure high intensity in different sectors of the focused fan-shaped light beam and also to help spread associated heat dissipation. Optionally, only a single central illumination source is used, and then the optics are correspondingly slightly modified by changing an angle of the conical mirror 9, and to make a central baffle 19 and adjust baffles 30 and 29 to limit the rays of the light plane, while the commonly observed intensity maximum at 0° (zenith) in an radiation diagram of a typical such illumination source 11 is not optimally utilized optimally, and the power dissipation is then too concentrated and potentially produces too much heat. An equivalent size 27 (or perceived size 27) of the illumination source 11 will be magnified by the imaging system to produce a focused image 18 as referred to FIG. 8A which is in magnitude S1/S2 times larger than the equivalent illumination source size 27, given that a distance S2 is a distance from the source 11 to the lens 10, and a distance S1 is a length from the lens 10 via the mirror 9 to the image 18, therein the image is symbolically represented by arrows 38 and 39. The equivalent size 27 of the illumination source is therefore an important limiting factor for producing a sufficiently thin fan-shaped light beam plane. A centralized illumination source 11 for high power dissipation and high illumination intensity will typically tend also to have a larger equivalent/perceived source size 27, meaning that the fan-shaped light beam plane will tend to be thicker in such configurations.

Further referring to FIG. 8B, the main purpose of a baffle 19 is to stop the light rays from each illumination source 11 with perceived source size 27 from illuminating the opposite part of the convex lens 10, namely to prevent any light ray from crossing the common optical axis 28 of the lens 10 and conical mirror 9. Some example light rays 31, 32, 33, 34, 36, 37 and 43 are drawn emanating from the illumination source 11 with source size 27 to describe an operating principle of the present invention for the illumination of the interaction surface 16 arranged for detection of position and/or detection of contact with the interaction surface 16. The light source 11 with its perceived source size 27 is focused at a distance S1 with a magnified image S1/S2 larger in magnitude, illustrated symbolically by the two arrows 38 and 39.

Part of the arrow 38 represents a part of the image 18 of the source 11 which will be absorbed and/or reflected by the interaction surface 16. If the surface properties of the interaction surface 16 is such that there is a reflection and the reflection is specular, there will be reflected a mirrored image 40 by the interaction surface 16 of this part of the arrow 38. Then, an object 25 in contact with the interaction surface 16 will be illuminated by a sum of the direct rays from the mirror 9 and the reflected rays also originating from the mirror 9 but reflected by the interaction surface 16. If the surface properties of the interaction surface 16 are such that there is mainly a diffuse reflection, the illumination rather close to the illumination surface will be increased by the diffusely reflected light components from the interaction surface 16. In the case the light rays emanating from the mirror 9 and illuminating the interaction surface 16 are totally absorbed in the interaction surface 16, there is no contribution to the illumination of the object 25 from the interaction surface.

As long as the symmetry axis 35 of the fan-shaped light beam plane emanating from the mirror 9 is not crossing the plane of the interaction surface 16 within the interaction volume 7, the thickness of the resulting plane is given by the front ray 31 which is delimited by the front ray delimiting baffle 29, and delimited by the interaction surface 16 itself. By arranging this axis crossing point with the plane of the interaction surface 16 to be outside the interaction surface 16, namely to the left side of interaction surface 16 in FIG. 8B, the part of the image mirrored by the interaction surface 16 will not be wider than the direct components of the image, as illustrated by the example light ray 33 which is originated from the extreme angle example light ray 37 which without the interaction surface 16 would have been continued in a ray 32 to the symbolic arrow end of the focused image 38, but due to likely specular reflections in the interaction surface 16 is reflected as the ray 33 to the symbolic arrow end of the focused mirrored image 40.

Further referring to FIG. 8B, the ray 34 is an extreme angle ray emanating from a delimitation of the source 11 with its associated source size 27 which is most far from the optical axis 28 passing the source rays limiting baffle 19 and is passing through the lens 10 on the periphery of the lens 10 and is hitting the conical mirror 9 close to the end of the mirror 9 where the diameter is largest, but after reflection in the mirror 9 the ray 34 is stopped by the rear rays limiting baffle 30. The extreme angle example light ray 34, if it were not stopped by the baffle 30 and the interaction surface 16, would have crossed the ray 32 in the symbolic arrow end of the focused image 38. The ray 43 is emanating from the same side of the source 11 with its source size 27 as the ray 34, but while the ray 34 is stopped by the baffle 30, the ray 43 passes the baffle 30 and is stopped by the side edge of the interaction surface 16, or may be illuminating the interaction plane 16 and be absorbed and reflected as described above. If there were no baffle 30 or interaction surface 16 stopping the rays, the example ray 37 renamed to the ray 32 and the example ray 34 emanate from the delimitation of the source 11 with its source size 27 which is most distant to the optical axis 28, and will meet and cross each other at the arrow end of the focused image 38.

Correspondingly, the example ray 36 and the front border example ray 31 emanate from the delimitation of the source 11 with its source size 27 which is closest to the optical axis 28 and will meet and cross each other at the arrow end of the focused image 39.

Advantages of the present invention is clearly illustrated by FIG. 8B. Firstly, by focusing the fan-shaped light beam aligned substantially parallel to the plane of the interaction surface 16, an image, as depicted by 39 and 38, of the illumination source in the far end of interaction surface 16, namely to the left in FIG. 8B, is delimiting the width of the beam. Secondly, the focusing provides that the intensity is not dropping too much at the furthest end, namely to the left in FIG. 8B, and maintains highest possible intensity level over the interaction surface 16, when the rays of the fan-shaped light beam fan out in a circular fashion from the conical mirror 9 and the circular spreading reduces beam intensity as one over the distance from mirror 9. Thirdly, the converging of the symmetry axis 35 towards the interaction surface 16 illuminating the interaction surface 16 provides a further delimitation of the light field, since the rear end of the light field is the interaction surface 16 itself. Fourthly, the converging of the symmetry axis 35 towards the interaction surface 16 provides that specular and diffuse components reflected back from the illuminated interaction surface 16 will increase the intensity close to the surface. Fifthly, the converging of the symmetry axis 35 towards the interaction surface 16 occurs without crossing the plane of the interaction surface 16 within the interaction surface 16, namely a crossing point with the plane is beneficially substantially to the left of the interaction surface 16 in FIG. 8B, and provides that any specular components reflected back from the interaction surface 16 will not increase the width of the illumination field, such that the width is effectively delimited by the front ray 31 and the interaction surface 16.

According to these five aforesaid advantageous properties provided by the present invention, a light beam 5 which is focused as narrowly as possible to keep its associated intensity as high as possible and which is substantially parallel or slightly converging to and limited by the interaction surface 16 is beneficially fanned out, namely fan-shaped, and distributed over and illuminating the interaction surface 16 from at least one fan-shaped light beam plane generating unit corresponding to the illuminant 2, thus providing a distinct and delimited illumination of the part of an object 25 which is in contact with, or synonymously is touching, the interaction surface 16.

Figure 8C:
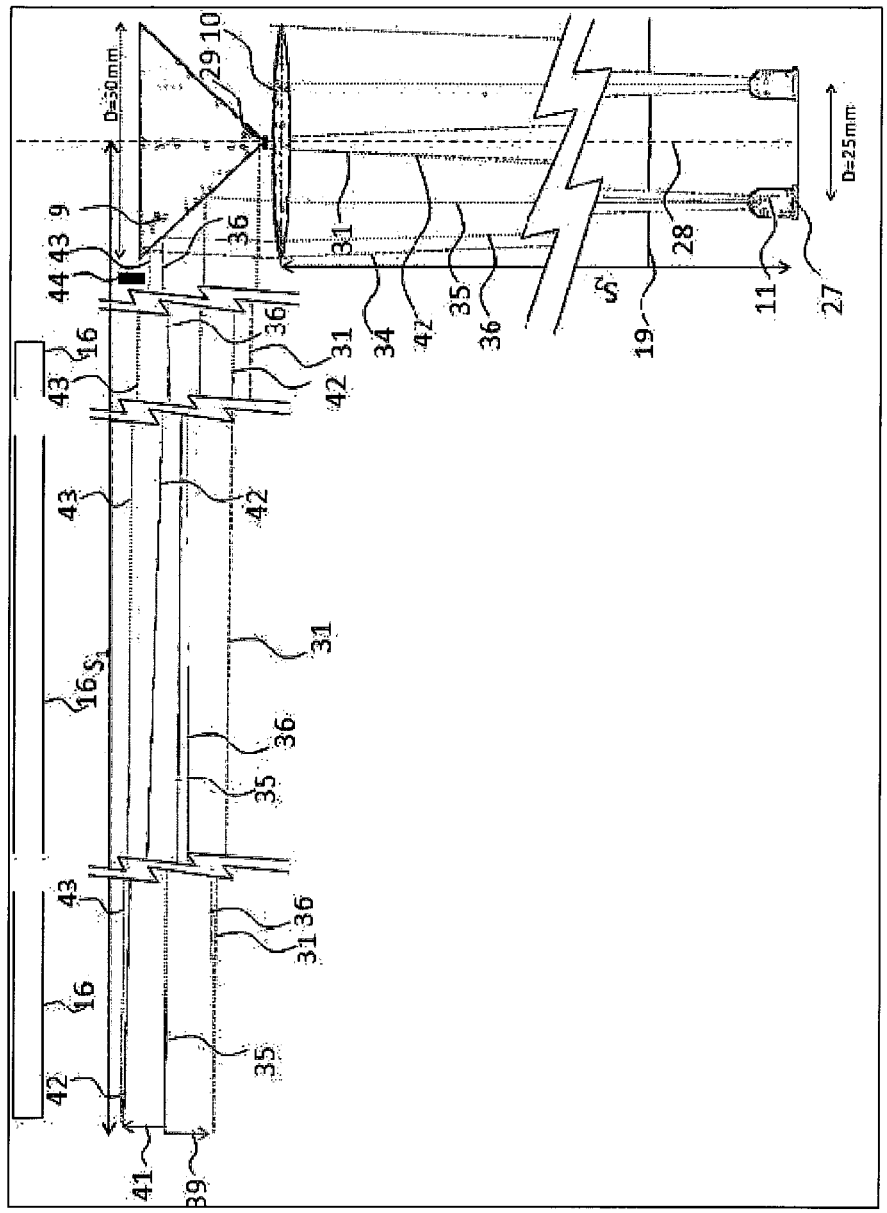
FIG. 8C is an illustration of an example of a related optical system as in FIG. 8A, wherein examples of light rays and the magnified source image are depicted, to create a light plane for detection of position and/or detection of hover level in the interaction volume.

In FIG. 8C, there is presented an example of a related optical system as in FIG. 7 and FIG. 8A, wherein examples of light rays and the magnified source image are depicted, to create a fan-shaped light beam plane for detecting position and/or for detecting a "hovering state" and/or a hover level in the interaction volume 7 over the interaction surface 16. The illumination sources 11, for example light emitting diodes (LED), are placed along a circle of diameter D=25 mm. A plurality of illumination sources 11 are optionally spread along a periphery to ensure high intensity in the different sectors of the focused fan beam and also to help to spread associated heat dissipation. Only a single central illumination source is optionally used, and then the optics have to be slightly modified by changing the angle of the conical mirror 9, and to make a central baffle 19 and adjust baffles 44 and 29 to limit the rays of the light plane, while the commonly observed intensity maximum at 0° (zenith) in the radiation diagram of a typical such illumination source 11 is then not be utilized optimally, and the power dissipation is more concentrated and could ultimately produce too much heat. The equivalent size 27, or perceived size 27, of the illumination sources 11 will be magnified by the imaging system to produce a focused image 18 as referred to FIG. 7 or FIG. 8A which is in magnitude S1/S2 times larger than the equivalent illumination source size 27, given that S2 is the distance from the source 11 to the lens 10, and S1 is the length from lens 10 via the mirror 9 to the image 18, the image here symbolically represented by the arrows 41 and 39. The equivalent size 27 of the illumination source 11 is therefore an important limiting factor for producing a sufficiently thin fan-shaped light beam plane. A centralized illumination source 11 for high power dissipation and high illumination intensity will typically tend to also have a larger equivalent/perceived source size 27, meaning that the fan-shaped light beam plane will tend to be thicker in such configurations.

Further referring to FIG. 8C, the main purpose of a baffle 19 is to stop light rays from each illumination source 11 with perceived source size 27 from illuminating an opposite part of the convex lens 10, namely to prevent any light ray from crossing the common optical axis 28 of the lens 10 and the conical mirror 9. Some example light rays 31, 34, 36, 42 and 43 are drawn emanating from the illumination source 11 with its source size 27 to describe the principle of the present invention for the illumination of the object 25 over the surface 16 arranged for detecting position and/or detecting "hovering" or determining a hover level within the interaction volume 7 over the interaction surface 16. The light source 11 with its perceived source size 27 is focused at a distance S1 with a magnified image S1/S2 larger in magnitude, illustrated symbolically by the two arrows 41 and 39.

Furthermore, referring to FIG. 8C, the example ray 43 is a most extreme angle ray emanating from the delimitation of the source 11 with its source size 27 which is most far from the optical axis 28 passing the source rays limiting baffle 19 and is passing through the lens 10 on the periphery of the lens 10 and is hitting the conical mirror 9 close to the end of the mirror 9 where the diameter is largest, and after reflection in the mirror 9 the ray 43 just passes the rear rays limiting baffle 30 and progresses over the interaction surface 16 and will in the image point symbolized with the arrow head of the arrow 41 meet and cross another example extreme angle ray 42 which is emanating from the same side of the source 11 passing the baffle 29 and progressing over the interaction surface 16. Correspondingly, the example ray 36 and the front border example ray 31 is emanating from the delimitation of the source 11 with its source size 27 which is closest to the optical axis 28 and will meet and cross each other at the arrow end of the focused image 39.

The advantages of even this configuration of the present invention is illustrated in FIG. 8C. Firstly, by focusing the beam aligned substantially parallel to the plane of the interaction surface 16, an image, as depicted by 39 and 41, of the illumination source in the far end of interaction surface 16, namely to the left in FIG. 8C, is delimiting the width of the beam. Secondly, the focusing provides that the intensity is not diminishing too much in the furthest end, namely to the left in FIG. 8C, and maintain highest possible intensity level over the interaction surface 16, where the rays of the fan-shaped light beam fan out in a circular fashion from the conical mirror 9 and the circular spreading is reducing beam intensity as one over the distance from the mirror 9. Thirdly, by adjusting the angle of the symmetry axis 35 by selecting an appropriate mirror angle of conical mirror 9, either the front border or the rear border or the symmetry axis is made parallel to the interaction surface 16 to optimize the determination of the hover level. Fourthly and finally, by adjusting the front rays limiting baffle 29 and rear rays limiting baffle 44, the width of the defocused beam close to the mirror 9 entering over the interaction surface is effectively delimited.

According to these aforementioned advantageous of the present invention, a light beam 26 which is focused as narrow as possible to keep the intensity as high as possible and which is substantially parallel to the interaction surface 16 is beneficially fanned out, namely is fan-shaped, and distributed over the interaction surface 16 from at least one fan-shaped beam light plane generating unit corresponding to the illuminant 2, thus providing a distinct and delimited illumination of the part of an object 25 which is in a particular hover level, namely is in "hovering mode", over the interaction surface 16.

Figure 9:
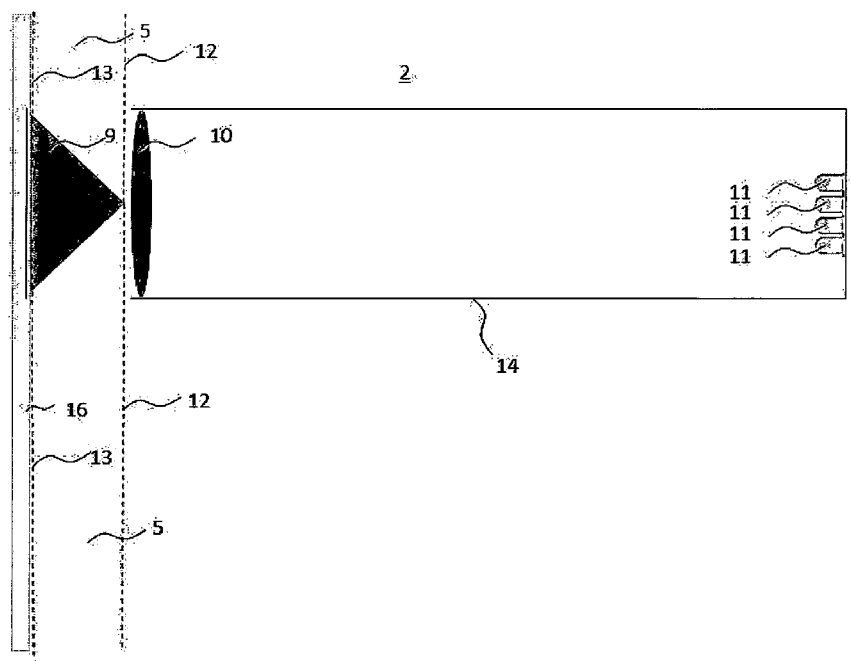
FIG. 9 is presenting an example of a focused fan-shaped light beam generating unit where the conically shaped mirror and the convex lens and illumination sources are mounted in a housing.

Referring to FIG. 9, an exemplary configuration of a focused fan beam generating unit, corresponding to the illuminant 2, for the present invention is illustrated wherein the conically shaped mirror 9 and the convex lens 10 and illumination sources 11 are mounted in a housing/enclosure 14 and are operable to produce, pursuant to the principles above, a fan-shaped light beam plane 5 along the interaction surface 16 within the "front border" 12 and "rear border" 13 of the light plane.

Figure 10:
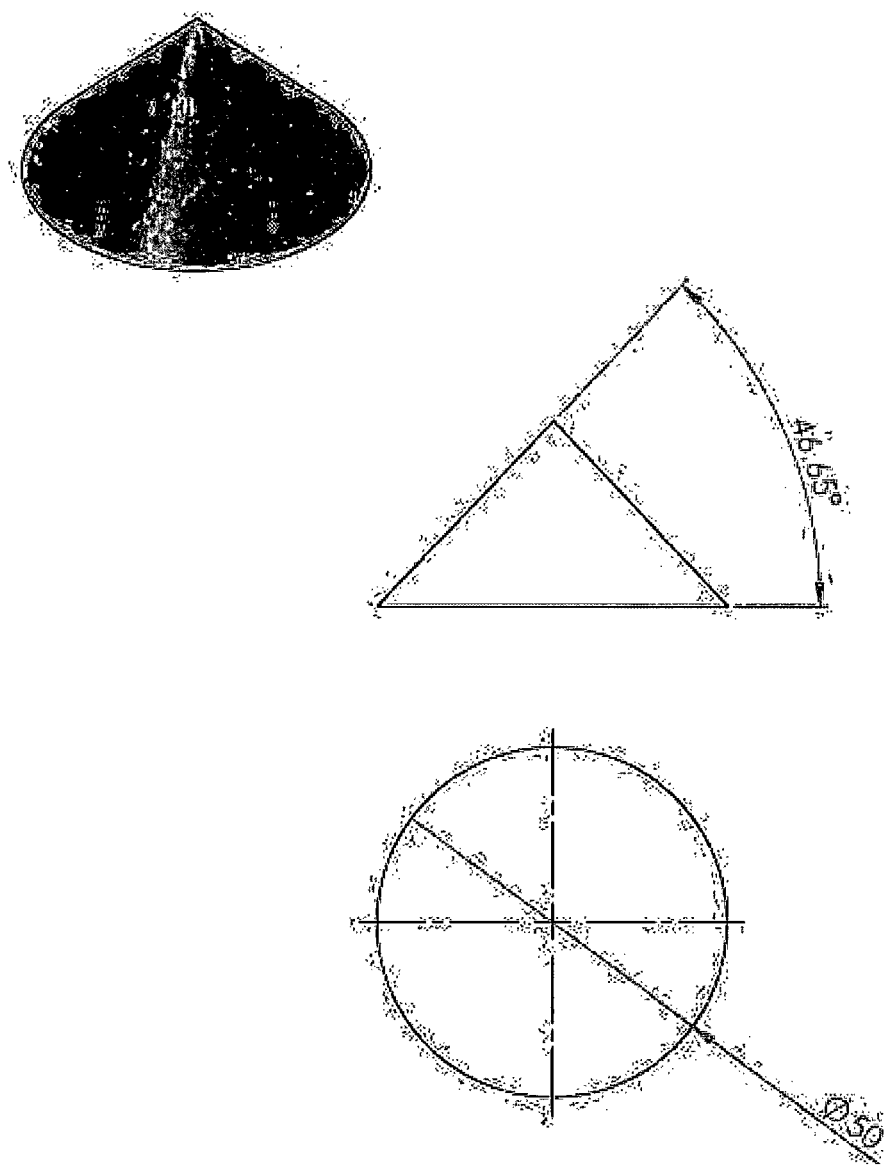
FIG. 10 is an illustration of an example of a manufactured conical mirror as in FIG. 8.

An exemplary configuration of a manufactured conical mirror as in FIG. 8A is illustrated in FIG. 10. The angle of the conical mirror is 46.65° and its diameter is D=50 mm. The mirror is optionally fabricated in various types of metal, for example aluminium, or the mirror is optionally implemented using plastics materials, for example by using injection moulding processes to generate a moulded component, with subsequent metallization of the component, for example by using vacuum-deposited Aluminium.

Figure 11:
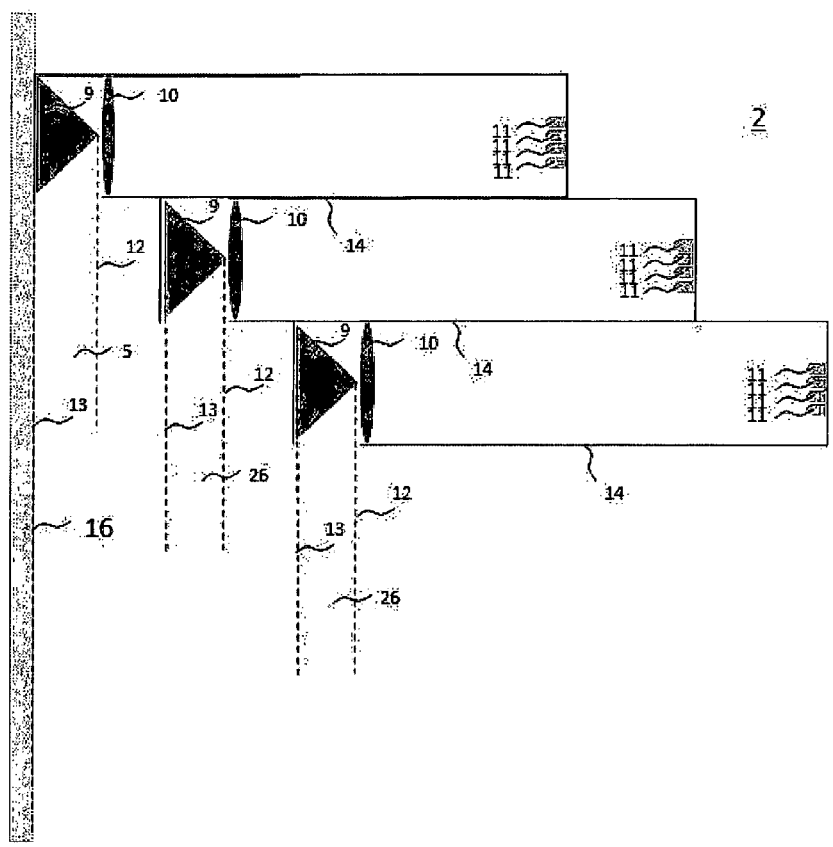
FIG. 11 is an illustration of an example configuration which uses several fan-shaped light beam generating units as in FIG. 9 for producing several light planes along the interaction surface.

Referring next to FIG. 11, an exemplary configuration of the present invention is shown using several fan-shaped light beam generating units corresponding to the illuminant 2, wherein the conically shaped mirrors 9 and the convex lenses 10 and the illumination sources 11 are mounted in housings/enclosures 14 and are operable to produce, by the principles elucidated above, several fan-shaped light beam planes 5, 26, along the interaction surface 16 with a "front border" 12 and "rear border" 13 for each of the light planes, and wherein the light plane 5 is arranged as elucidated above for determination of X-Y position and/or contact (touch), while the other light planes 26 are arranged as elucidated above for the determination of X-Y position and/or hovering and/or hovering levels.

Figure 12:
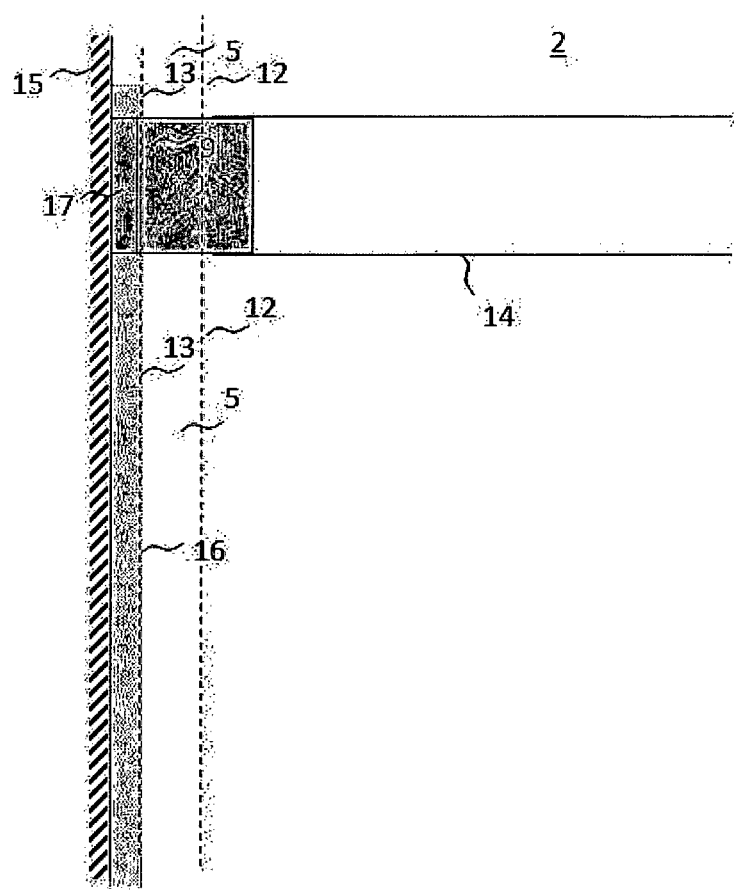
FIG. 12 is an illustration of a fan-shaped light beam generating unit as in FIG. 9 as seen from above, wherein the unit is mounted above an interaction surface on the wall with a light plane optics mount.
Figure 13:
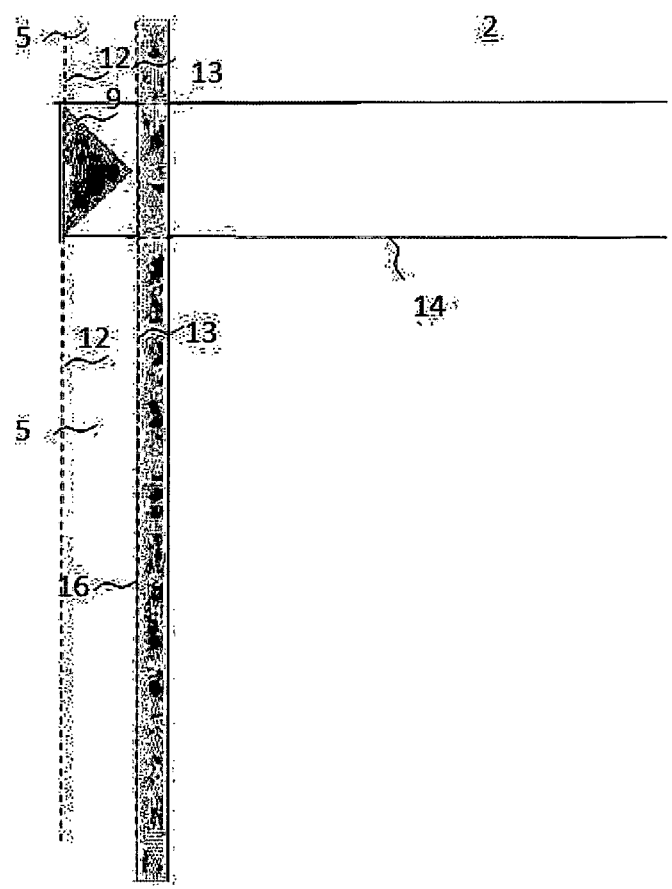
FIG. 13 is an illustration of a fan-shaped light beam generating unit as in FIG. 9 as seen from above, wherein the unit is mounted through a hole in the wall above an interaction surface with a light plane optics mount in a rear projection system.

An exemplary configuration of a fan of ray generating unit as the illuminant 2 as seen from above for the present invention as in FIG. 9 is depicted in FIG. 12 where the unit is mounted above the interaction surface 16 on the wall 15 with a light plane optics mount 17. In a similar manner, but for rear projection or flat screen systems, FIG. 13 is an illustration of an exemplary configuration of a fan-shaped light beam generating unit for implementing the illuminant 2 as seen from above for the present invention as in FIG. 9. In FIG. 9, the unit with its enclosure 14 is mounted above a interaction surface 16 with a light plane optics mounted in a rear projection system such that there is a hole 7 through the wall and/or interaction surface 16, wherein only the left part of the unit is extending into the side of the wall and interaction surface 16 where the interaction is performed.

Figure 14:
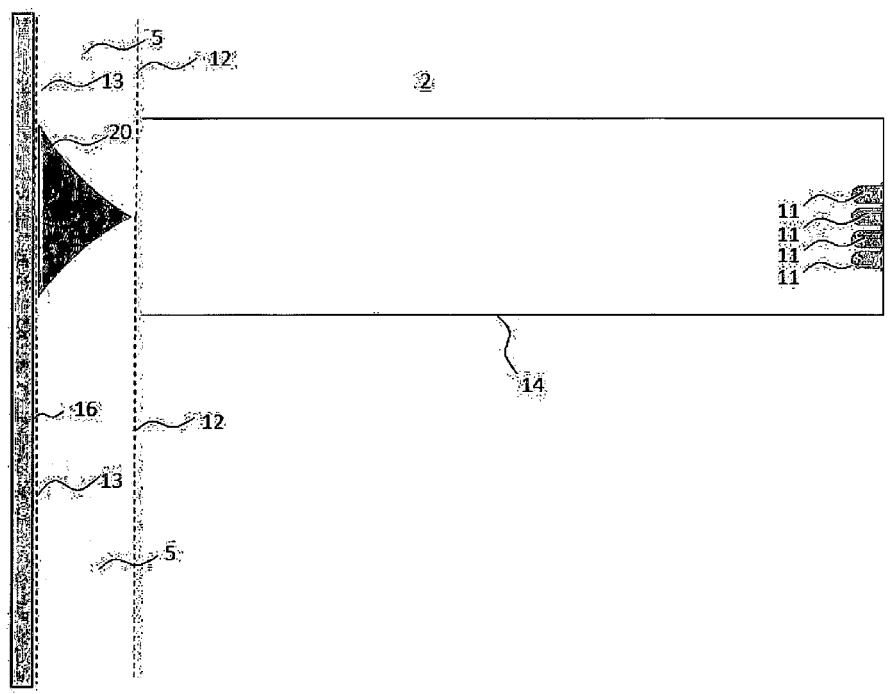
FIG. 14 is an illustration of a fan-shaped light beam generating unit which, in principal, is similar in function to that in FIG. 9 but using a concave conically mirror.

Instead of using a straight conical mirror 9 and a convex lens 10 for performing the focusing as elucidated above and the spreading in a fan-shaped light beam over the interaction surface 16, FIG. 14 is an illustration of an exemplary configuration of a fan-shaped light beam generating unit for the illuminant 2 with similar function as FIG. 9, but using a concave conically mirror 20 to combine the focusing function and the orthogonal spreading function in one optical element. Such an optical element is beneficially manufactured by employing similar methods as employed for fabricating the conical mirror shown in FIG. 10. The element is optionally fabricated in various types of metal, for example Aluminium, or it is fabricated from plastics materials by employing injection moulding with subsequent metallization of the plastic part, for example by using vacuum-deposited Aluminium and/or by electroplating processes.

Figure 15:
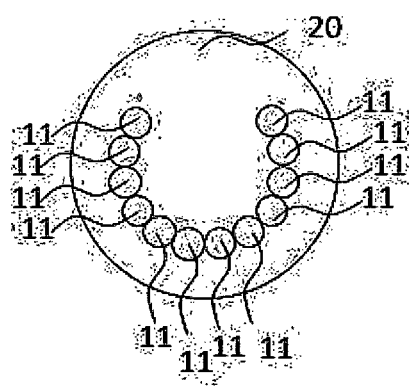
FIG. 15 is an illustration of a manner in which illumination sources are susceptible to being arranged for conically shaped mirrors as in FIG. 7 to FIG. 14.

Since the fan-shaped light beam generated by the fan-shaped light beam generating unit corresponding to the illuminant 2 only needs to be fanned out in sectors, the illumination sources need not to be distributed evenly in a full circle. FIG. 15 is an illustration of an exemplary configuration of a manner in which the illumination sources 11 are optionally arranged for conically shaped mirror embodiments as in FIG. 7 to FIG. 14.

Figure 16:
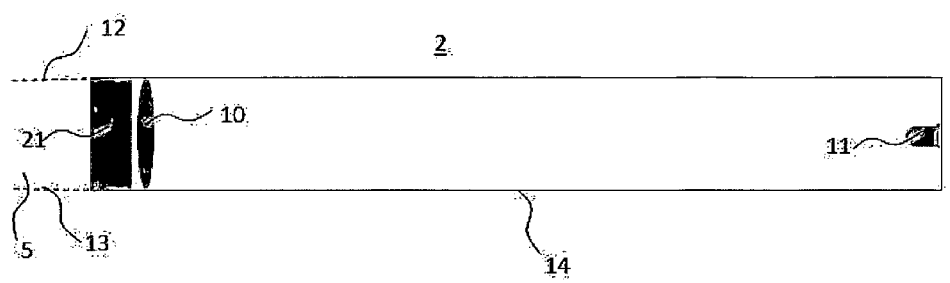
FIG. 16 is an illustration, in side view, of a focused fan-shaped light beam generating unit, wherein a cylindrical lens, a convex lens and illumination sources are mounted within a housing.

In FIG. 16, there is illustrated an exemplary configuration, from side view, of a system employing a focused fan-shaped light beam generating unit corresponding to the illuminant 2. The system further comprises a cylindrical lens 21 and a convex lens 10 and a plurality of illumination sources 11 which are beneficially mounted in a housing enclosure 14. The illumination sources 11 are operable to emit light which propagates to the lens 10 to provide a more collimated beam which then propagates through the cylindrical lens 21 to generate a fan-shaped light beam for illuminating the interaction volume 7 associated with the interaction surface 16.

Figure 17:
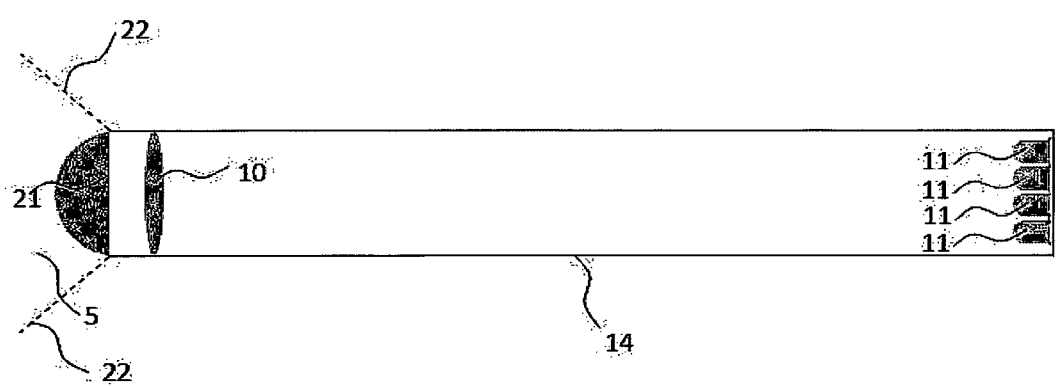
FIG. 17 is an illustration of a focused fan-shaped light beam generating unit, as in FIG. 16, but as seen from above, wherein a cylindrical lens, a convex lens and illumination sources are mounted in a housing.
Figure 18:
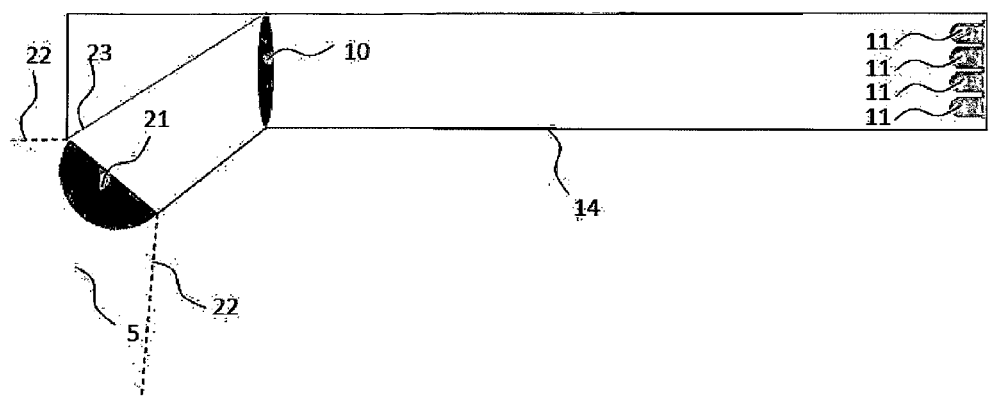
FIG. 18 is an illustration of the example of FIG. 17, but wherein the axis is tilted by using a flat mirror.
Figure 19:
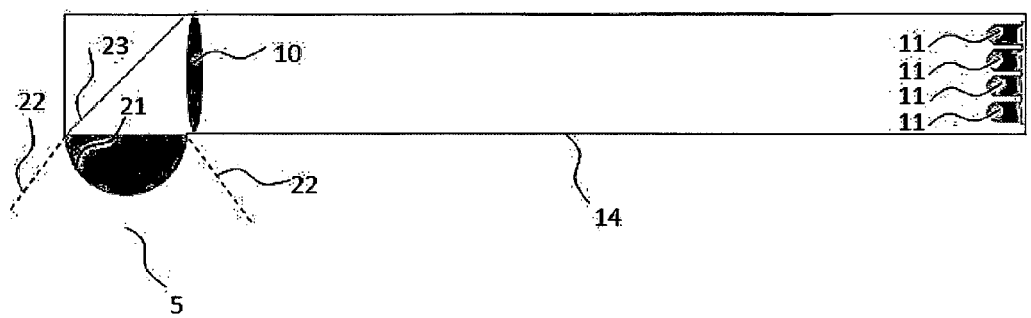
FIG. 19 is an illustration of the example of FIG. 17, but wherein the axis is deflected by 90 degrees by using a flat mirror.

In FIG. 17, there is illustrated an exemplary configuration, from above view, of a system for implementing a fan-shaped light beam generating unit corresponding to the illuminant 2. The exemplary configuration further includes a cylindrical lens 21 and a convex lens 10 together with illumination sources 11 which are beneficially mounted in a housing unit/enclosure 14 for generating a fan-shaped light beam plane 5, 26 along a main axis of the of the convex lens 10 within an angle given by borders 22. In operation, light emitted from the sources 11 propagates to the lens 10 wherein the light becomes more collimated and subsequently progresses through the cylindrical lens 21 to generate the fan-shaped light beam plane 5, 26. In FIG. 18, there is illustrated an alternative exemplary configuration to FIG. 17, but where the axis is tilted by using a flat mirror 23. In FIG. 19, there is illustrated an exemplary configuration similar to FIG. 17, but where the axis is deflected by 90°, namely deflected orthogonally, by using a flat mirror 23 disposed at a 45° angle.

Figure 20:
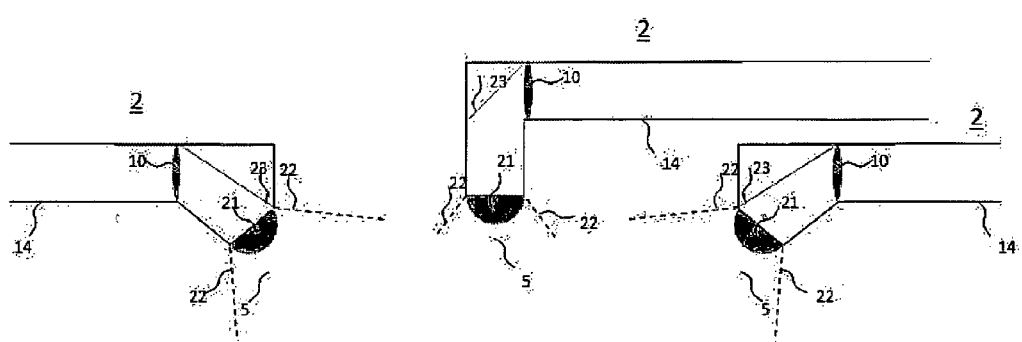
FIG. 20 is an illustration of an example combination of the examples of FIG. 17, FIG. 18 and FIG. 19 for generating a wider fan-shaped light beam plane.

In FIG. 20, there is illustrated an exemplary configuration derived by collocating embodiments from FIG. 17, FIG. 18 and FIG. 19 to generate a wider fan-shaped light beam plane 5, 26 with more ideal spatial characteristics. In the exemplary configuration of FIG. 20, there are left-side, central and right side illuminants 2, wherein the central illuminant 2 has its lens 21 disposed with its axis symmetrical to the light plane 5, 26, and the left-side and right-side illuminants 2 with their respective lenses 21 at an execute angle, for example in a range of 20° to 80° relative to the lens 21 of the central illuminant 2.

Figure 21:
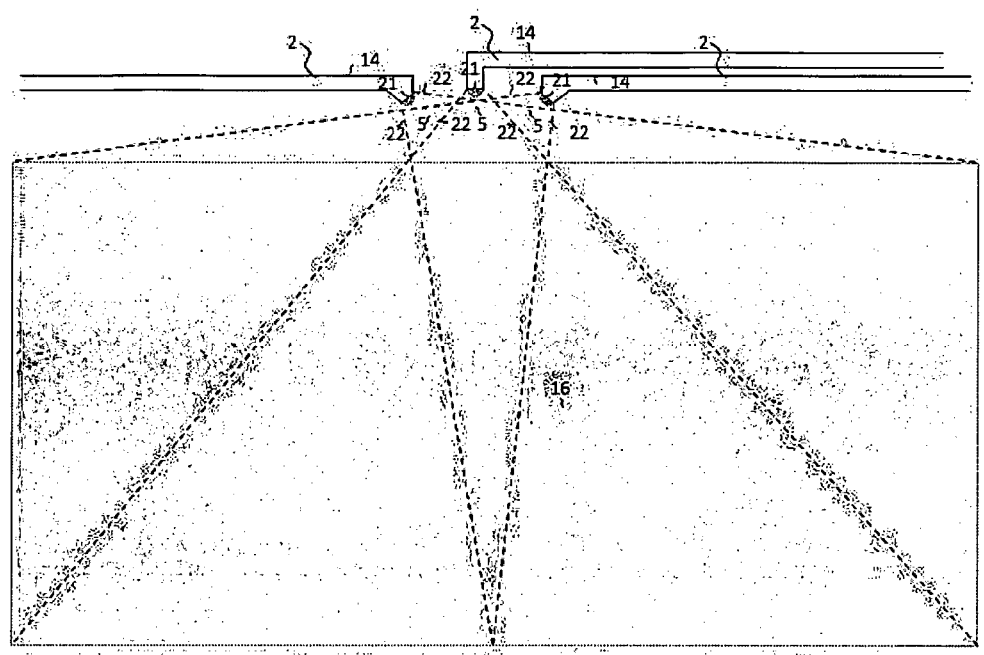
FIG. 21 is an illustration of an example configuration combining the examples of FIG. 17, FIG. 18 and FIG. 19 for generating a wider fanshaped light beam plane covering a complete interaction surface and using long enclosures which provide smaller magnification of the source and thinner layer of the fan-shaped light beams.
Figure 22:
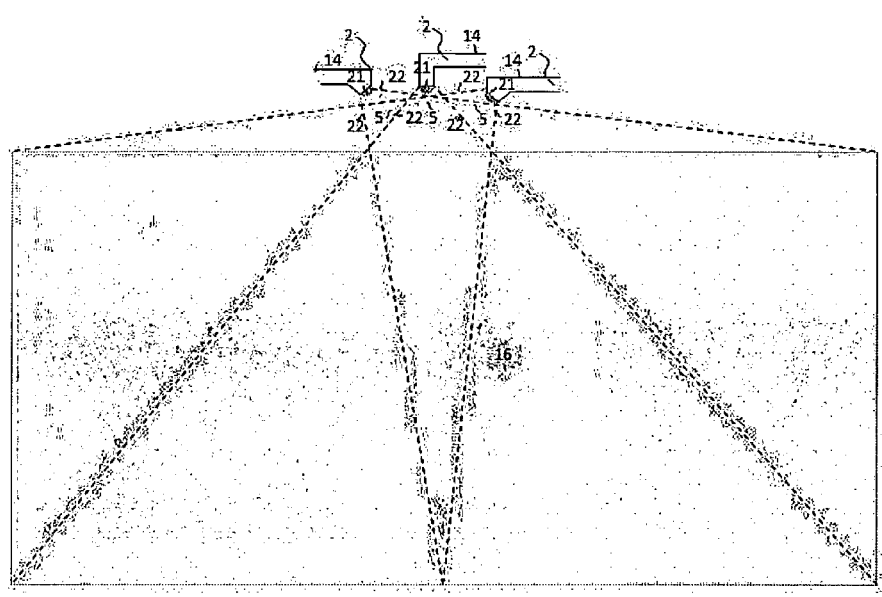
FIG. 22 is an illustration of an example combination of the examples of FIG. 17, FIG. 18 and FIG. 19 for generating a wider fan-shaped light beam plane covering a complete interaction surface and using short enclosures which give larger magnification of the source and thicker layer of the fan-shaped light beams.

In FIG. 21, there is illustrated an exemplary configuration which includes the embodiments from FIG. 17, FIG. 18 and FIG. 19 collocated to generate a wider fan-shaped light beam light planes 5, 26 covering a complete interaction surface 16. The enclosures 14 of the illuminants 2 are implemented to be relatively longer than illustrated in FIG. 20, and fields of rays from the illuminants 2 of FIG. 21 are arranged to overlap in operation as illustrated. The longer enclosure result in a smaller magnification of the sources 11 and a thinner layer of illumination. As an alternative to rendering the enclosures longer in FIG. 21, the enclosures 14 are rendered shorter as illustrated in FIG. 22 for obtaining a larger magnification of the sources 11 and thereby a thicker layer of illumination.

Figure 23:
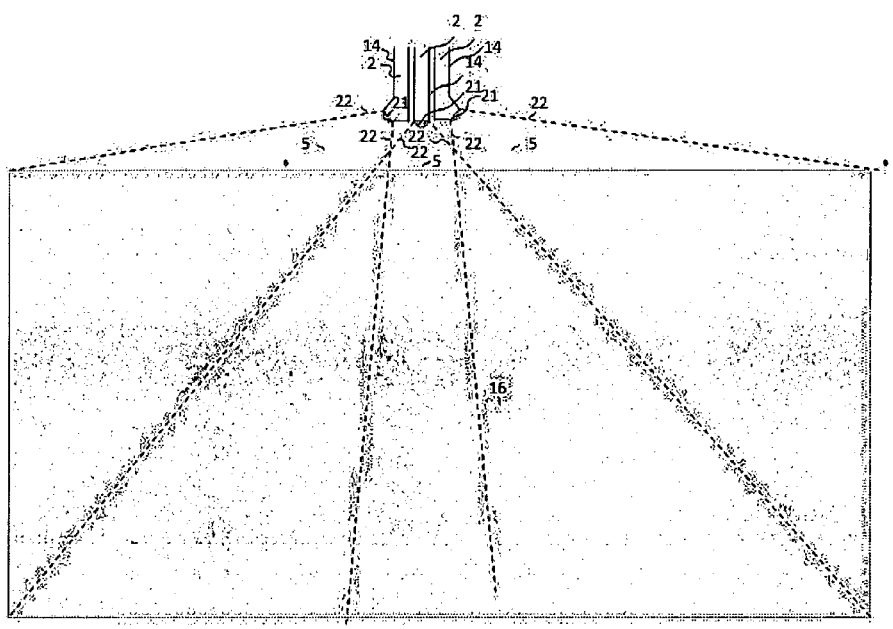
FIG. 23 is an illustration of an example combination of variants of the examples of FIG. 17, FIG. 18 and FIG. 19 and mounted vertically, for generating a wide fan-shaped light beam plane covering a complete interaction surface.

In FIG. 23, there is illustrated an exemplary configuration wherein embodiments substantially similar to FIG. 17, FIG. 18 and FIG. 19 are collocated together generate a fan-shaped light beam 5, 26 for illumination of the complete interaction surface 16. The exemplary configuration in FIG. 23 includes right-side, central and left-side illuminants 2 whose respective enclosures 14 have their central axes disposed in a mutually parallel manner as illustrated. For example, the illuminants 2 in FIG. 23 are beneficially mounted so that the central axes of the enclosures 14 are in a vertical orientation when in use.

Figure 24:
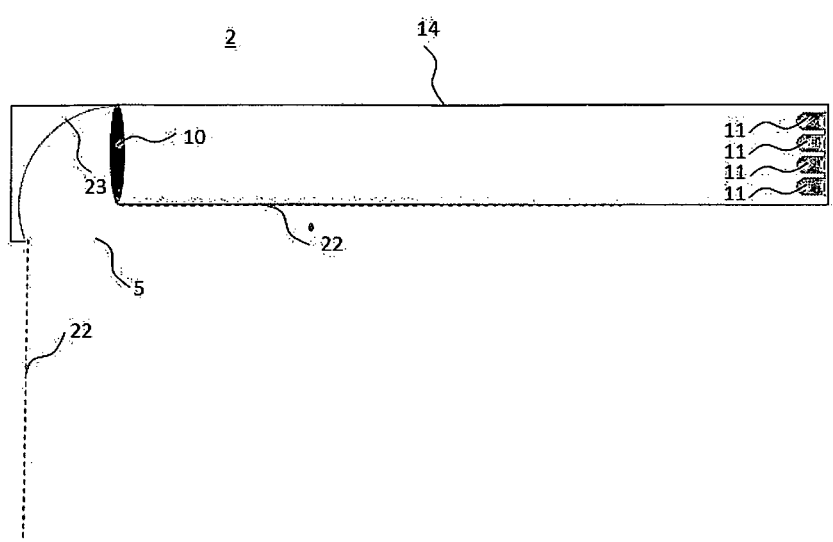
FIG. 24 is an illustration of an example using a concave cylinder mirror, for generating a fan-shaped light beam plane covering parts of the interaction surface from a corner.

In FIG. 24, there is illustrated an exemplary configuration for implementing the illuminant 2 by employing a concave cylindrical mirror, to generate a fan-shaped light beam plane 5, 26 for covering parts of an interaction surface 16 from a corner.

Figure 25:
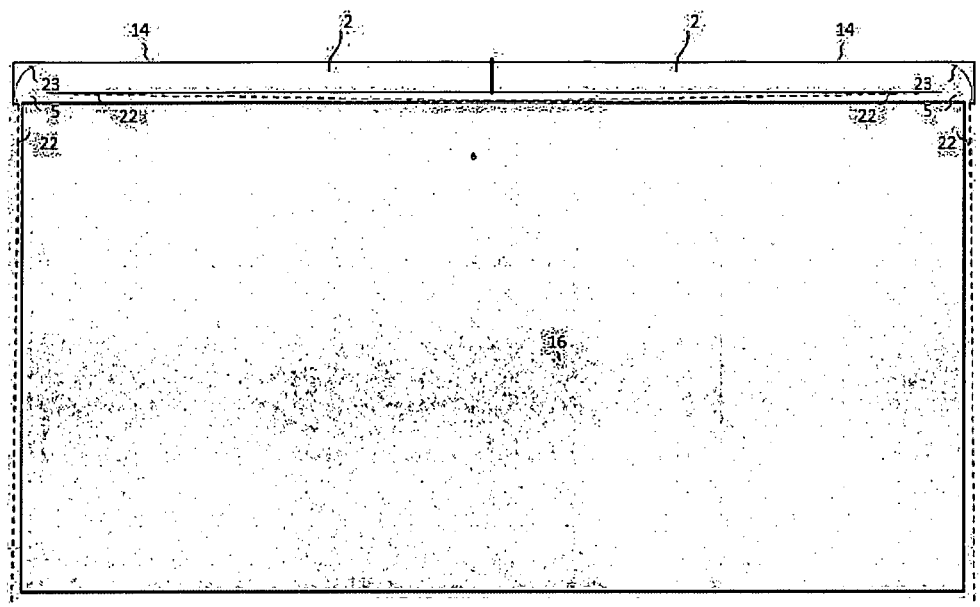
FIG. 25 is an illustration of an example using concave cylinder mirrors, for generating two sets of fan-shaped light beam planes covering the interaction surface from two corner.
Figure 26:
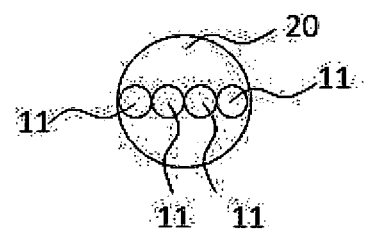
FIG. 26 is an illustration of a manner in which the illumination sources may be arranged for the cylinder lens and cylinder mirror based examples as in FIG. 16 to FIG. 25.

In FIG. 25, there is illustrated an exemplary configuration of the illuminant 2 based upon aforementioned illuminants 2, but which employs a concave cylinder mirror, to generate a fan-shaped light beam planes 5, 26 covering an interaction surface 16 from upper corners of the of the interaction surface 16. Moreover, in FIG. 26, there is shown an exemplary configuration of a manner in which the illumination sources 11 are arranged for a cylindrical lens and cylindrical mirror based on FIG. 16 to FIG. 25.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

The invention claimed is:

1. A camera-based multi-touch interaction system for determining at least one of a position and a posture of at least one object in front of an interaction surface, wherein said system comprises:

an illuminant arrangement adapted to generate a plurality of light beam planes and radiate each of the plurality of light beam planes along the interaction surface, each of the plurality of light beam planes including a plurality of planar fan-shaped light beams of at least one of visible and near-infrared light radiation, the at least one object being operable to penetrate and be illuminated by at least one single light beam plane of the plurality of light beam planes in front of the interaction surface;

a camera arrangement adapted to be directed towards the interaction surface and to sense the interaction surface within a field-of-view of the camera arrangement to generate corresponding signals; and a computational unit for computing the at least one of the position and the posture of the at least one object illuminated by the at least one single light beam plane in front of the interaction surface based on the signals generated by the camera arrangement, wherein the plurality of planar fan-shaped light beams are formed so that each of the light beam planes is parallel to the interaction surface, and each of the light beam planes is located at a different distance from the interaction surface, the plurality of light beam planes that are at different distances from the interaction surface and are selectively and sequentially switched on and off for sequentially illuminating parts of the at least one object that are at the different distances from the interaction surface, and each of the plurality of planar fan-shaped light beams are focused in a direction perpendicular to a plane of the interaction surface so that the plurality of planar fan-shaped light beams have a constant thickness in said direction, the plurality of light beam planes includes a first single light beam plane and a second single light beam plane, the second single light beam plane being farther from the interaction surface than the first single light beam plane, the corresponding signals generated by the camera arrangement include first signals and second signals, when the at least one object is illuminated by the first single light beam plane, the computational unit directly determines, based only on the first signals generated by the camera arrangement, which are generated by the camera arrangement in accordance with only the at least one object being illuminated by the first single light beam plane, that the at least one object is touching the interaction surface, and when the at least one object is illuminated by the second single light beam plane but is not illuminated by the first single light beam plane, the computational unit directly determines, based only on the second signals generated by the camera arrangement, which are generated by the camera arrangement in accordance with only the at least one object being illuminated by the second single light beam plane, that the at least one object is hovering over the interaction surface.

2. A system according to claim 1, where the plurality of planar fan-shaped light beams are arranged to illuminate the interaction surface.

3. A system as claimed in claim 1, wherein the system is operable to detect a hovering position of the at least one object in respect of the interaction surface.

4. A system as claimed in claim 1, wherein each of the plurality of planar fan-shaped light beams is disposed to illuminate a corresponding spatial region in a vicinity of the interaction surface, such that corresponding spatial regions of the planar fan-shaped light beams provide for contiguous illumination of a complete region in a vicinity of the interaction surface.

5. A system as claimed in claim 1, wherein the plurality of planar fan-shaped light beams are arranged to illuminate a volume adjacent to the interaction surface, but not the interaction surface itself.

6. A system as claimed in claim 1, wherein the illuminant arrangement includes light sources which are operable to be selectively modulated in intensity for enhancing a determination of touching of one or more objects onto the interaction surface, at least one of a hovering and a hovering level of the one or more objects relative to the interaction surface.

7. A system as claimed in claim 6, wherein the light sources are operable to be selectively switched on and off.

8. A system as claimed in claim 6, wherein the light sources are operable in a flashing mode within an active sensing period of the camera arrangement for effectively freezing motions of the one or more objects.

9. A system as claimed in claim 1, wherein the camera arrangement includes one or more optical filters for selectively blocking out or passing radiation to be received by sensors of the camera arrangement depending upon a wavelength of the radiation.

10. A system as claimed in claim 9, wherein the one or more optical filters are operable to allow light intercepted by one or more objects with the same wavelength range as light emitted from the illuminant arrangement to pass through to the camera arrangement.

11. A system as claimed in claim 9, wherein the one or more optical filters are operable to allow only visible light to pass therethrough for capturing the images from a projector or flat screen at the interaction surface.

12. A system as claimed in claim 1, wherein the illuminant arrangement includes a plurality of light sources for generating the plurality of planar fan-shaped light beams to include radiation at near-infrared wavelengths, and wherein the camera arrangement includes one or more optical filters which block visible radiation wavelengths and transmits near-infrared radiation wavelengths to reduce sensitivity of the system to other light sources including one or more of: daylight, room illumination, light from projectors, display lights.

13. A system as claimed in claim 1, wherein the system is integrated into new equipment or retrofitted into existing equipment and is adapted for making such equipment interactive.

14. A system as claimed in claim 13, wherein the system is implemented as a front or rear projection apparatus.

15. A system as claimed in claim 1, wherein the system is adapted to be operably mounted onto or integrated into projector wall mounts or screen mounts including at least one of: LCD, OLED, LED, CRT.

16. A system as claimed in claim 1, wherein the illuminant arrangement includes one or more enclosures whose respective lengths for their associated illumination optical components are arranged to render different layers of the plurality of focused planar fan-shaped light beams sufficiently thin to increase a resolution and accuracy of the system to touching and Z-directional gestures of one or more objects relative to the interaction surface.

17. A system as claimed in claim 16, wherein the illuminant arrangement includes one or more light emitting laser diodes which are operable to emit near-infrared radiation for further reducing a thickness of the plurality of planar fan-shaped light beams in a direction orthogonal to a plane of the interaction surface.

18. A system as claimed in claim 1, wherein the camera arrangement is implemented using CCD or CMOS pixel sensors, and the illuminant arrangement is implemented using near-infrared LEDs and associated optical components adapted to either transmit or reflect near-infrared radiation, or adapted to both transmit and reflect near-infrared radiation.

19. A system as claimed in claim 1, wherein the illuminant arrangement includes:
- a convex lens for providing focusing of radiation transmitted therethrough;
- a plurality of illumination sources, wherein the illumination sources are arranged spread along a portion of a periphery of a circle having a center in a central axis of the lens to ensure concentrated radiation intensity in sectors of the plurality of focused planar fan-shaped light beams and also to help spreading associated heat dissipation;
- a baffle arranged to limit illumination from the illumination sources to approximately half of a diameter of the convex lens; and
- a conical mirror to change a symmetry axis to be parallel to the interaction surface.

20. A system as claimed in claim 19, wherein the conical mirror includes a reflecting surface angle which is adapted to tilt an optical symmetry axis of the planar fan-shaped light beam forming towards the interaction surface.

21. A system according to claim 19, wherein the baffle is arranged to stop the light rays from each illumination source of the illuminant arrangement with perceived source size from illuminating an opposite part of the convex lens, thereby preventing any light ray from crossing a common optical axis of the lens and the conical mirror.

22. A system as claimed in claim 19, wherein the illuminant arrangement further includes the conical mirror arranged so that its reflecting surface angle is adapted to compensate for axes of light sources employed to generate the plurality of planar fan-shaped light beams being non-aligned to a central axis of the convex lens.

23. A system as claimed in claim 1, wherein the plurality of planar fan-shaped light beams have associated front borders which are arranged sufficiently distanced from the interaction surface to illuminate an area corresponding to the entire interaction surface such that rear borders are essentially bounded by the interaction surface.

24. An apparatus for use in implementing the system as claimed in claim 1.

25. A method of employing a camera-based multi-touch interaction system for determining at least one of a position and a posture of at least one object in front of an interaction surface, wherein said system comprises:
- an illuminant arrangement adapted to generate a plurality of light beam planes and radiate each of the plurality of light beam planes along the interaction surface, each of the plurality of light beam planes including a plurality of planar fan-shaped light beams of at least one of visible and near-infrared light radiation,
- the at least one object being operable to penetrate and be illuminated by at least one single light beam plane of the plurality of light beam planes in front of the interaction surface;
- a camera arrangement adapted to be directed towards the interaction surface and to sense the interaction surface within the camera's field-of-view to generate corresponding signals; and
- a computational unit for computing the at least one of the position and the posture of the at least one object illuminated by the at least one single light beam plane in front of the interaction surface based on the signals provided from the camera arrangement, wherein said method comprises:

forming the plurality of planar fan-shaped light beams so that each of the light beam planes is parallel to the interaction surface, and each of the light beam planes is located at a different distance from the interaction surface;

selectively and sequentially switching on and off the plurality of light beam planes that are at different distances from the interaction surface for sequentially illuminating parts of the at least one object that are at the different distances from the interaction surface;

focusing each of the plurality of planar fan-shaped light beams in a direction perpendicular to a plane of the interaction surface so that the plurality of planar fan-shaped light beams have a constant thickness relative to and orthogonal to the plane of the interaction surface, wherein the plurality of light beam planes includes a first single light beam plane and a second single light beam plane, the second single light beam plane being farther from the interaction surface than the first single light beam plane, and wherein the corresponding signals generated by the camera arrangement include first signals and second signals;

when the at least one object is illuminated by the first single light beam plane, directly determining, by the computational unit, based only on the first signals generated by the camera arrangement, which are generated by the camera arrangement in accordance with only the at least one object being illuminated by the first single light beam plane, that the at least one object is touching the interaction surface; and when the at least one object is illuminated by the second single light beam plane but is not illuminated by the first single light beam plane, directly determining, by the computational unit, based only on the second signals generated by the camera arrangement, which are generated by the camera arrangement in accordance with only the at least one object being illuminated by the second single light beam plane, that the at least one object is hovering over the interaction surface.

* * * * *